United States Patent [19]

Drucker

[11] Patent Number: 4,818,886

[45] Date of Patent: Apr. 4, 1989

[54] METHOD AND APPARATUS FOR SELF-REFERENCING AND SELF-FOCUSING A BAR-CODE READER

[75] Inventor: Steven H. Drucker, Oakland, Calif.

[73] Assignee: Quential, Inc., Berkeley, Calif.

[21] Appl. No.: 52,762

[22] Filed: May 20, 1987

Related U.S. Application Data

[63] Continuation-in-part of Ser. No. 930,328, Nov. 12, 1986.

[51] Int. Cl.⁴ .............................................. G06K 7/10
[52] U.S. Cl. .................................... 250/566; 235/462; 235/472
[58] Field of Search ............... 250/234, 566, 568, 201, 250/204; 235/462, 463, 472

[56] References Cited

U.S. PATENT DOCUMENTS

| | | |
|---|---|---|
| 3,663,803 | 5/1972 | Mohan et al. . |
| 3,669,312 | 10/1972 | Jones et al. . |
| 3,700,858 | 10/1972 | Murthy . |
| 3,701,097 | 10/1972 | Wolff . |
| 3,723,710 | 3/1973 | Crouse et al. . |
| 3,731,064 | 5/1973 | Berler et al. . |
| 3,778,597 | 12/1973 | Vanderpool et al. . |
| 3,792,235 | 2/1974 | Durante et al. . |
| 3,849,632 | 11/1974 | Eckert, Jr. et al. . |
| 3,864,548 | 2/1975 | O'Neill, Jr. et al. . |
| 3,882,464 | 5/1975 | Zamkow . |
| 3,891,831 | 6/1975 | Coles, Jr. . |
| 3,893,077 | 7/1975 | Myren . |
| 3,925,639 | 12/1975 | Hester . |
| 3,927,303 | 12/1975 | Wefers et al. . |
| 3,985,999 | 10/1976 | Yoneyama . |
| 3,991,299 | 11/1976 | Chadima, Jr. et al. . |
| 4,000,397 | 12/1976 | Hebert et al. . |
| 4,004,131 | 1/1977 | O'Neill, Jr. et al. . |
| 4,034,230 | 7/1977 | Brill et al. . |
| 4,044,227 | 8/1977 | Holm et al. . |
| 4,074,114 | 2/1978 | Dobras . |
| 4,135,663 | 1/1979 | Nojiri et al. . |
| 4,136,821 | 1/1979 | Sugiura et al. .................... 250/568 |
| 4,146,046 | 3/1979 | Dobras . |
| 4,146,782 | 3/1979 | Barnich . |
| 4,147,295 | 4/1979 | Nojiri et al. . |
| 4,160,156 | 7/1979 | Sherer . |
| 4,175,693 | 11/1979 | Nakanishi et al. . |
| 4,219,152 | 8/1980 | Couch et al. . |
| 4,245,152 | 1/1981 | Flurry et al. . |
| 4,272,675 | 6/1981 | Blanford et al. . |
| 4,411,016 | 10/1983 | Wakeland . |
| 4,458,145 | 7/1984 | Voles .................................. 250/204 |
| 4,517,455 | 5/1985 | Benitez et al. . |
| 4,528,443 | 7/1985 | Smith . |
| 4,578,570 | 3/1986 | Mazumder et al. . |
| 4,613,759 | 9/1986 | Frohbach . |
| 4,652,731 | 3/1987 | Chautemps et al. . |

*Primary Examiner*—Edward P. Westin
*Attorney, Agent, or Firm*—A. C. Smith

[57] ABSTRACT

A scanning device and method for reading bar code or other contrasting marks from a surface at a variable distance from the scanning device operates by modulating the focal point of the optical system to yield pulse responses on detected code bars while in focus, and average background response levels from the bar code surface while out of focus. Modulation of focal point of the optical system is achieved in selected ways such as by positioning optical elements using piezoelectric or electromagnetic drivers or liquid-crystal elements, or by staggering the positions along an optical axis of arrays of optical sensors, or of optical fibers coupled to the sensors. The light sources and detectors may be transposed to provide an array of individual light sources that are selectably and rapidly energized at locations in the optical system which provide illumination that is substantially in focus or out of focus on the surface being scanned. The detected reflections from focussed and unfocussed devices are processed to produce output signals representative of the bar-coded data independently of scanning rate and spacing between the scanning device and the bar-coded surface being scanned.

36 Claims, 20 Drawing Sheets

POSITION 1 = NEAR FOCUS
POSITION 2 = MID FOCUS
POSITION 3 = FAR FOCUS

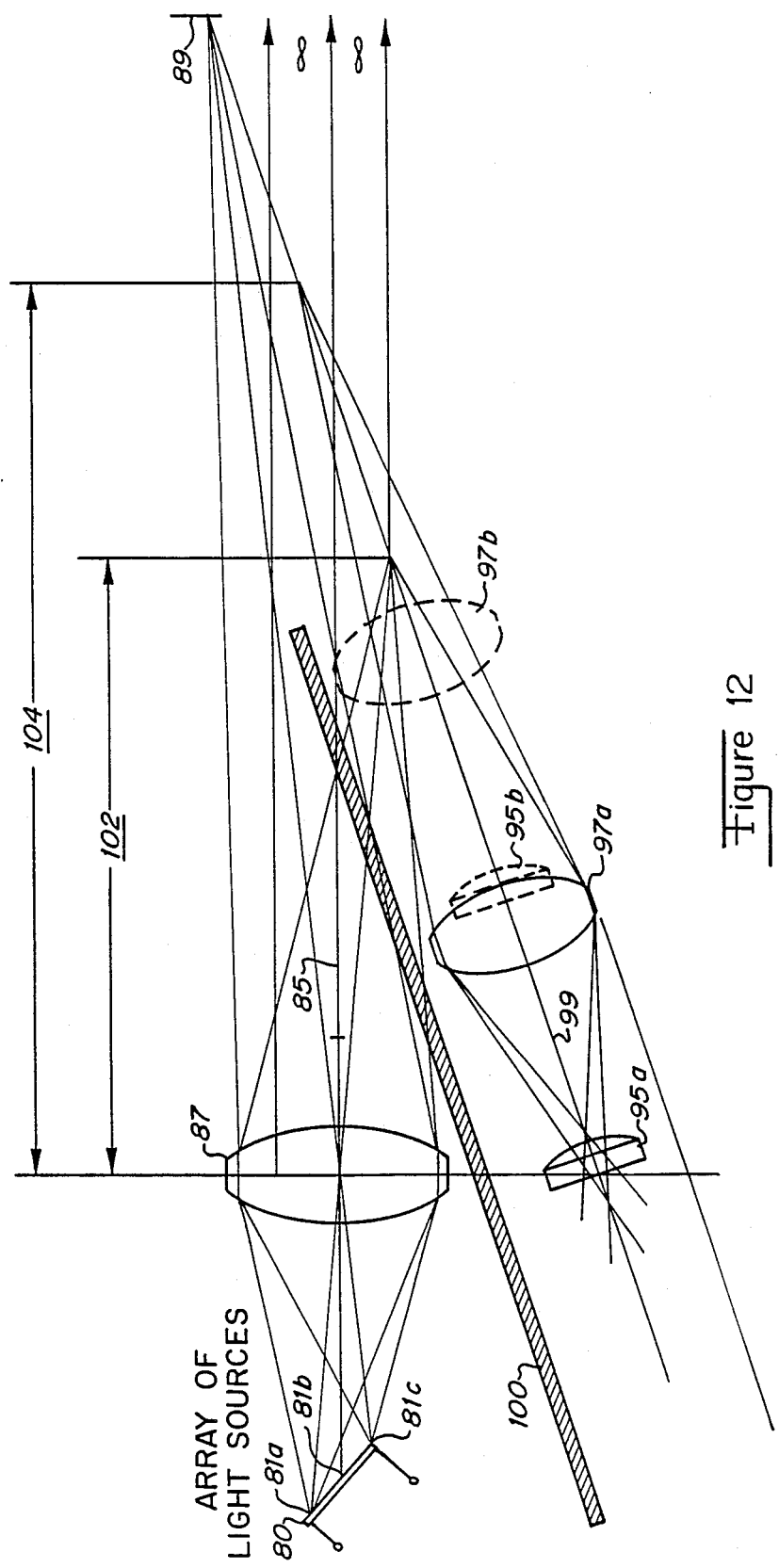

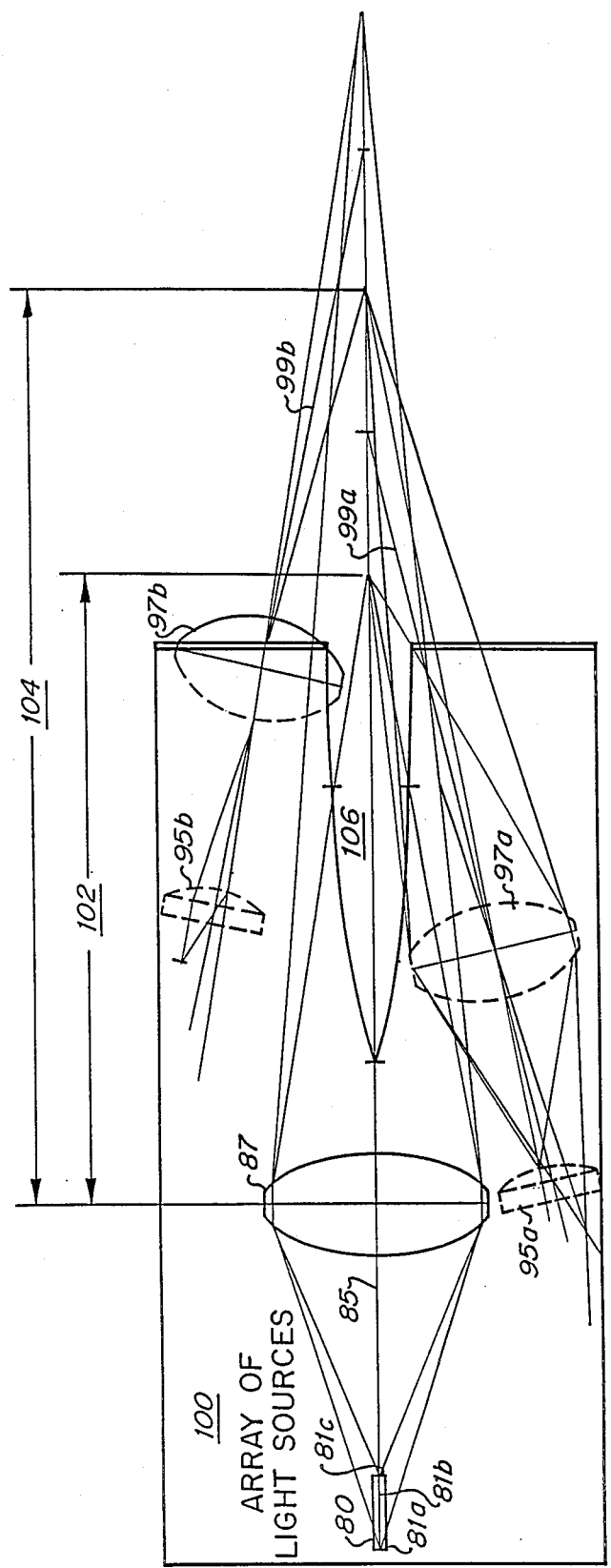

INIT MODE

NOTES

1) ZERO MEMORY LOCATIONS WHICH ARE NOT YET ACTIVE.

2) SET WHT AND BLK LEVELS TO ZERO LEVEL (LED NOT ON) TO PROVIDE BASELINE AND STARTING COMPARISON TRUE "WHITE" & "BLACK" LEVELS.

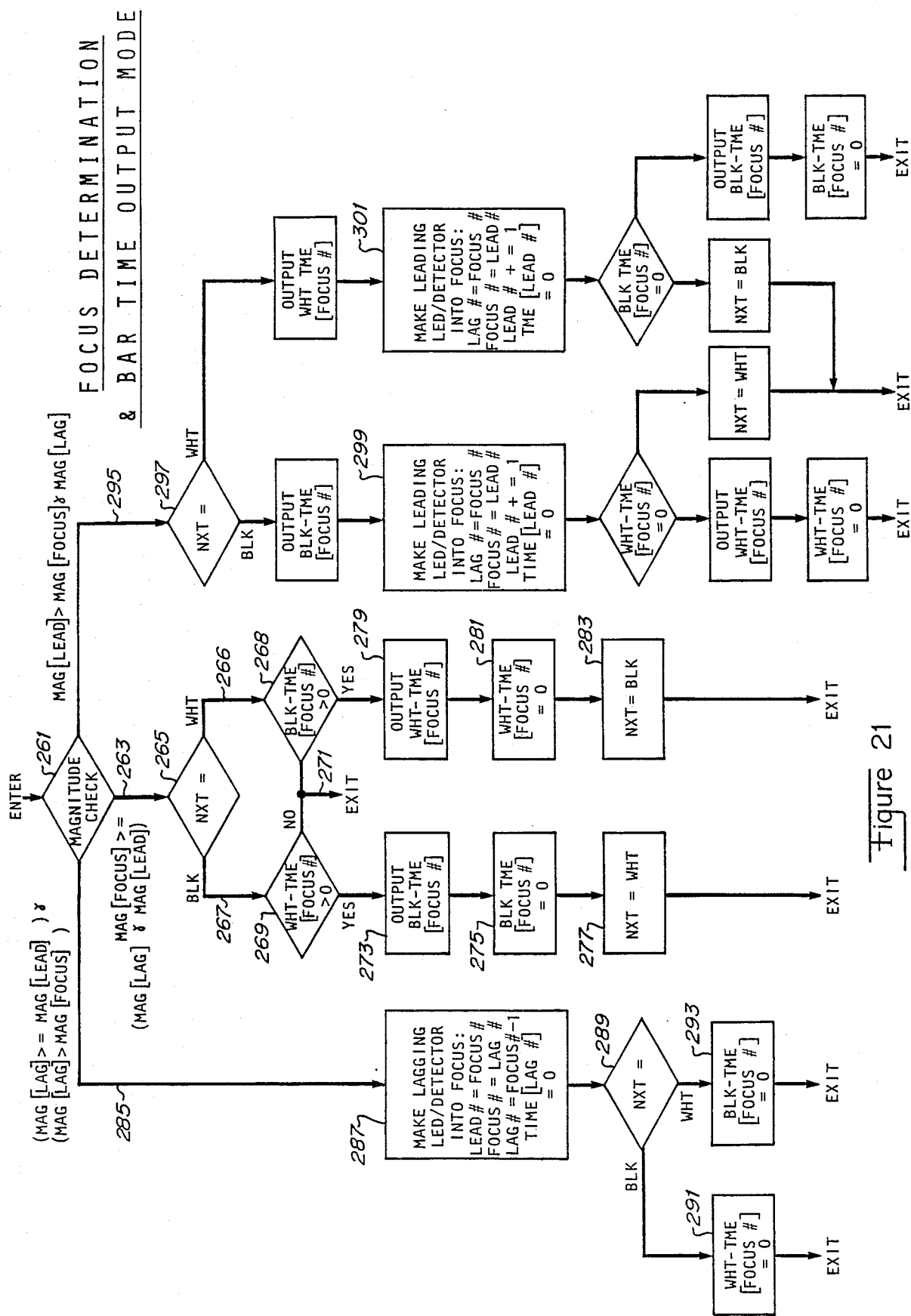

SHIFT→BEHIND

IF MAG (AHEAD) = MAG (BEHIND) > MAG FOCUS
GO TO AHEAD LED. IF AHEAD LED IS OUT OF
FOCUS, CAN DROP BACK UNTIL FOCUS AND CAN
RE-READ PREVIOUSLY UNFOCUSED DATA.

ALWAYS GOING TO SWITCH ON NARROW BAR!
(EVEN NON-FOCUSED LED IS IN FOCUS ON WIDE BAR)

| 3 2 1 | CASE | | | NWN | | | NARROW | NARROW | NARROW | |
|---|---|---|---|---|---|---|---|---|---|---|
| | 10 | 3 | X | 10 | X | X | 10 | X | X | 1 |
| | 10 | 3 | 1 | 10 | 3 | X | 10 | X | X | 1 |
| | 10 | 1 | 1 | 10 | 3*₀ | 1 | 10 | 3 | X | 2 |
| | 9 | 1 | 1 | 10 | 1 | 1*₀ | 10 | 3 | 1 | 3 |
| | 8 | 1 | 1 | 9 | 1 | 1*₀ | 10 | 1 | 1 | 4 |
| | M1 | W1 | B1 | M2 | W2 | B2 | M3 | W3 | B3 | NOTES* |

*NOTES:
1) OUTPUT IS APPROPRIATE FROM IN FOCUS LED/DET 2
2) OUTPUT→W2 : 3
3) OUTPUT→B2 : 1
4) SWITCH FOCUS BEHIND TO LED/DET 3 & NULL B2

Figure 22

SHIFT ⟶ AHEAD

OUTPUT: W2 : 3 LED/DET 2  ⎫
SWITCH TO LED/DET 1         ⎬ BETTER TO OUTPUT
NULL W1                             ⎭ W1 : 3 THAN W2 : 3

LED/DET 1    NO OUTPUT

SWITCH POINTS:
           NNN   NARROW
           WNN   WIDE
           WNW   WIDE
           NNW   NARROW

— NEED NARROW TO DETERMINE NEW FOCUS
                      — DETECT DIFFERENCE

| | | |
|---|---|---|
| NARROW | NARROW | OUTPUT 2 |
| NARROW | NARROW | OUTPUT 2 |
| NARROW | WIDE | OUTPUT 1 |
| NARROW | WIDE | OUTPUT 1 |

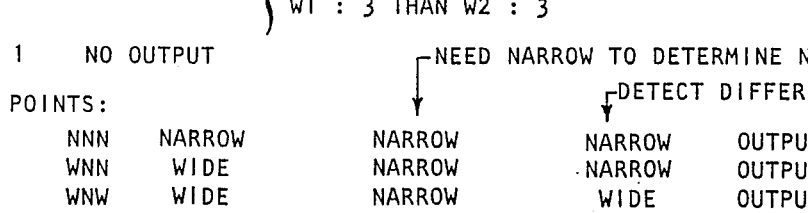

| M1 | B1 | W1 | M2 | B2 | W2 | M3 | B3 | W3 | NOTES |
|---|---|---|---|---|---|---|---|---|---|
| 9 | X | X | 10 | X | X | 9 | X | X | 1 |
| 10 | X | 3$^{WA}$ | 10 | X | X | 9 | X | X | 1 |
| 10 | 1$^{BA}$ | 3$^{WA}$ | 10 | X$^0$ | 3$^{WA}$ | 9 | X | X | 2 |
| 10 | 1$^{BA}$ | 1$^{WB}$ | 10 | 1$^{BA}$ | 3$^0$ | 9 | X | 3 | 3 |
| 10 | 1$^{BB}$ | 1$^{WB}$ | 10 | 1$^{BA}$ | 1$^{WB}$ | 8 | 1 | 3 | 4 |
| 10 | 1$^{BB}_0$ | 1$^{WB}$ | 9 | 1$^{BB}$ | 1$^0$ | 6 | 1 | 1 | 5 |

CASE: = NARROW NARROW WIDE

NOTES:
1) NOT IMPORTANT
2) FOCUS 2   OUTPUT B2 : X
3) FOCUS 2   OUTPUT W2 : 3    WA
4) FOCUS 2   OUTPUT B2 : 1    BA
5) FOCUS SHIFT
    FOCUS 2   OUTPUT W2 : 1  ⎫WB  NOTE - BETTER TO OUTPUT
    FOCUS 1   NULL W1 : 1     ⎭          & NULL W1

AT TIME OF SWITCH W1 = W2    B1 = B2

Figure 23

METHOD AND APPARATUS FOR SELF-REFERENCING AND SELF-FOCUSING A BAR-CODE READER

RELATED APPLICATION

This application is a continuation-in-part of pending application Ser. No. 930,328, entitled "Method & Means for Self Focussing a Bar-Code Reader", filed on Nov. 12, 1986, by Steven H. Drucker.

BACKGROUND OF THE INVENTION

Certain known bar code readers rely upon optical sensors which are located a fixed focal length away from the bar code being detected. This may be accomplished by operating a bar code transducer in contact with the surface upon which the bar code is printed. In other bar-code readers, collimated light from a laser is used to scan a bar code on or near a plane of detection. In these and other conventional bar-code readers the object bearing the bar code being detected is usually referenced at a fixed focal distance from the detector in order to pick up a sharp, optical reproduction of an image of the bar code. Also, known bar-code readers commonly require normalizing schemes to assure proper sensing of bar codes that are printed on materials of different background colors and textures, and that are to be detected under varying ambient lighting conditions. Further, known bar-code readers terminate operations for a brief period if insufficient reflected light is received, and then periodically test for sufficient reflected light indicative of close proximity of the reader to a reflective surface. Readers of this type are disclosed in the literature (see, for example, U.S. Pat. No. 3,925,639).

SUMMARY OF THE INVENTION

In accordance with the present invention, an improved method and means of operating an optical sensor facilitates the scanning and detection of a bar code located at a random focal distance from the sensor, and under varying lighting and background conditions. Specifically, the effective focal position of an optical system for the present bar-code reader is modulated over a selected range of distances to provide both effective background reference conditions and a sharp image of the bar code on the optical detector. Several schemes are provided for modulating the effective focal distance of the optics, and the associated circuitry converts the sensed images to digital signals representative of the detected bar code.

DESCRIPTION OF THE DRAWINGS

FIG. 12 is a side view of the apparatus of the present invention;

FIG. 13 is a top view of the apparatus illustrated in FIG. 12;

FIG. 21 is a chart illustrating the FOCUS DETERMINATION & BAR TIME OUTPUT mode of operation in the routine of FIG. 16;

FIG. 22 is a table of data illustrating the shift of operation to the lagging device as the focus device according to the present invention; and FIG. 23 is a table of data illustrating the shift of operation to the leading device as the focus device according to the present invention.

DESCRIPTION OF THE PREFERRED EMBODIMENT

Figure 1:
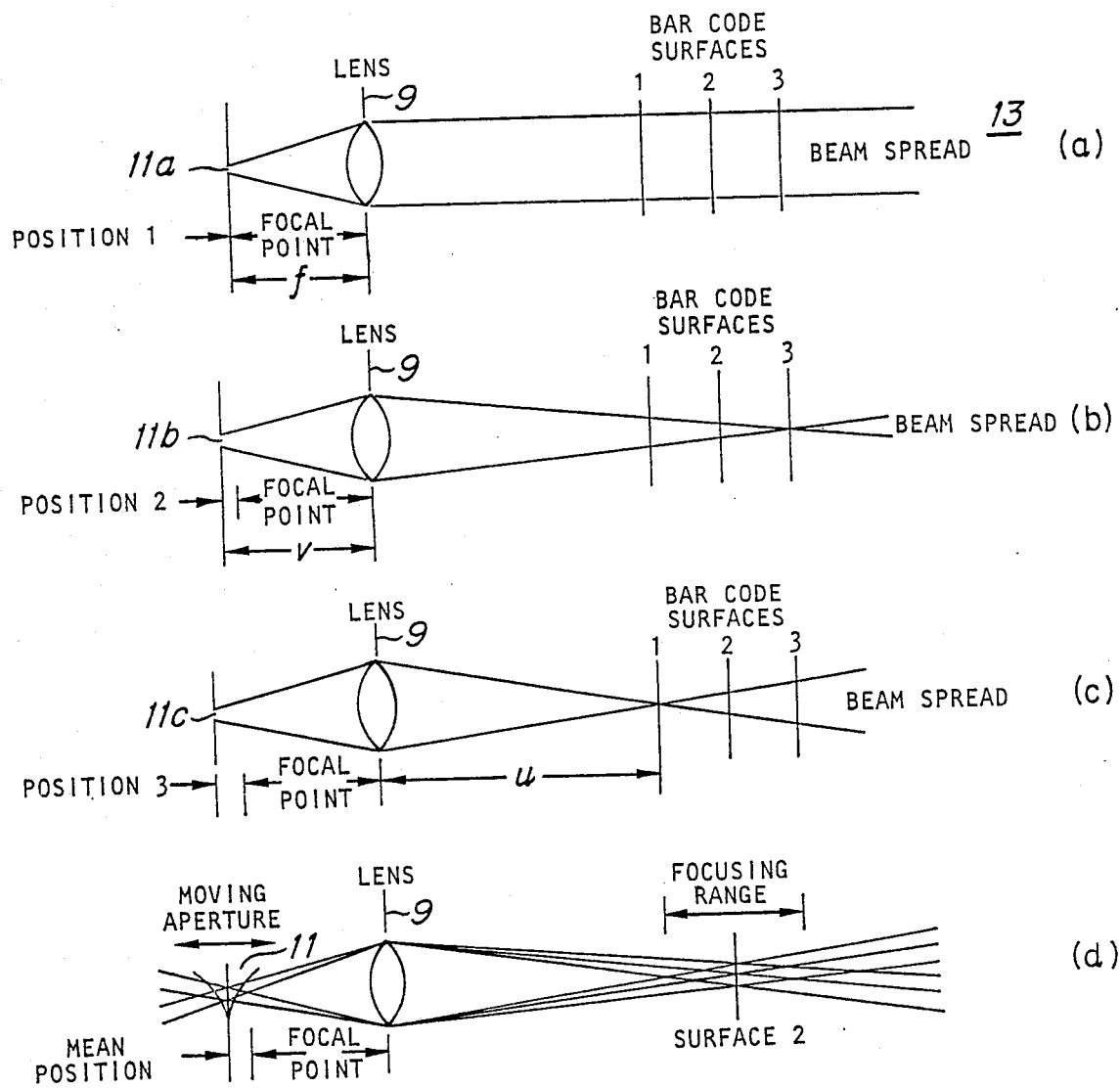
FIGS. 1 (a)–(d) are pictorial schematic diagrams which illustrate the features of the present invention.

Referring now to FIGS. 1 (a)–(d), there are shown pictorial diagrams of the optical system of the bar-code reader which illustrated several aspects of the present invention. The convex lens 9 has a selected focal length (f) which is a function of the ratio of curvatures of its faces. The simplified formula relating focal length (f) and distance(u) from lens 9 to an object, and distance (v) from lens 9 to the image, is:

$$1/f = 1/u + 1/v \qquad \text{Eq. (1)}$$

Thus, for a fixed-focal length of the lens 9 and an aperture 11 located at the image plane, the object distance (u) is governed by the formula:

$$1/u = 1/f - 1/v; \quad \text{Eq. (2)}$$

$$1/u = (v/vf) - (f/vf) = (v-f/vf) \quad \text{Eq. (3)}$$

$$u = (vf/v-f) \quad \text{Eq. (4)}$$

Thus, if the aperture 11(a) is placed at the focal point of the lens, V=F and the object is effectively at infinity 13, as illustrated in FIG. 1(a). An optical sensor located at the focal point will respond to the average ambient surface brightness of a bar-code pattern on a surface 1, 2 or 3 located at any distance from the lens 9.

Figure 2:
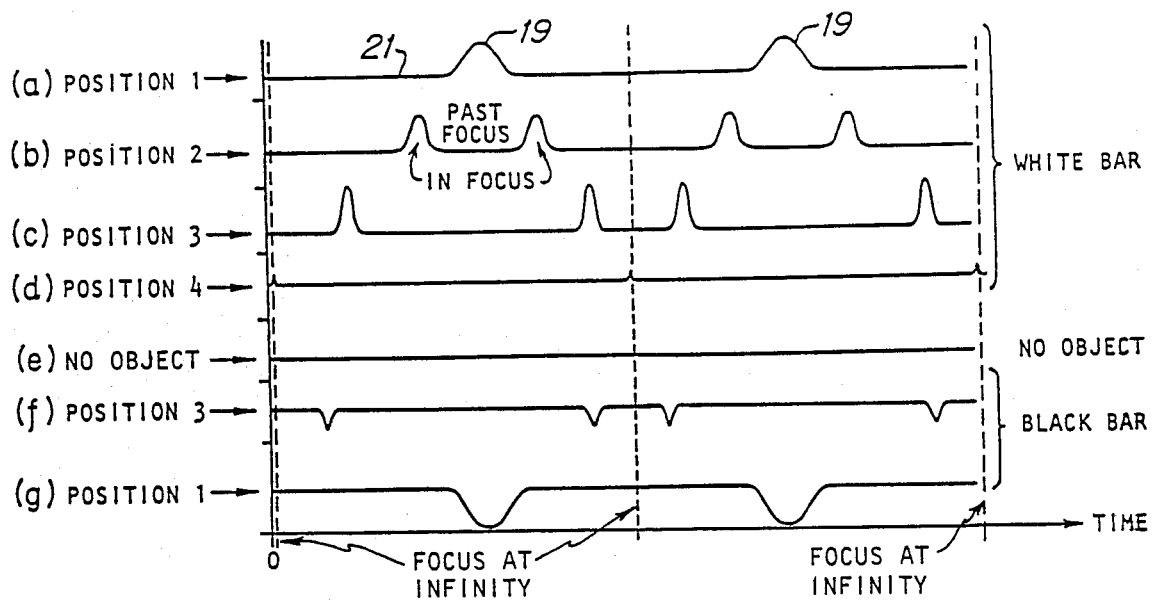
FIG. 2 is a graph illustrating various waveforms associated with operations of the embodiments of the present invention.

If an optical element such as an aperture, or mirror, or sensor is spaced (11b) away from the lens 9 on its image side beyond the focal length (f), the associated object distance or focal distance moves closer to the lens 9 from infinity, as illustrated in FIG. 1(b). Thus, a bar-code pattern located at this focal distance 3 is in focus, but a bar-code pattern located at 1 or 2 intermediate to the spacing between lens 9 and location 3 is out of focus, but is sensed at aperture location 11b as the average surface brightness of dark and light portions of the bar-code pattern on the surface lying within the field of view of the lens 9. Thus, an optical sensor that is operated at location 11b is able to focus upon and distinguish specific bars and spaces in a bar-code pattern at location 3 and is able to detect the average surface brightness of a bar-code pattern at location 1 or 2. Similarly, if an optical sensor is spaced (11c) further away from lens 9 on its image side, as illustrated in FIG. 1(c), the focal distance (u) moves closer to lens 9 to location 1, and bar-code patterns at location 2 or 3 are out of focus. Thus, by effectively moving an optical element such as an aperture or mirror or sensor between locations 11a and 11c (i.e. at the focal point and at a location beyond the focal point), the distance from the lens at which an object is in focus varies over a broad range. Thus, an optical sensor of a conventional type that produces an electrical signal representative of incident light, and that is effectively moved back and forth between locations 11a and 11c from a median position 11b, as illustrated in FIG. 1 (d), produces a series of wave forms, as illustrated in FIG. 2, under the various operating conditions specified. Similar responses are possible by moving an aperture 11 or mirror back and forth along the optical axis of the lens 9, as illustrated in FIG. 1(d).

In each of the embodiments of the present invention, it should be noted that the image which is projected onto the sensor at the focal point must be the size of the object (i.e., the code bar) that is being detected or distinguished against background. The largest dimension of the active region of a sensor is selected to be approximately the same order of magnitude as the image of the code bar being detected. Thus, as a white code bar comes into focus, the sensor produces a peak of response, as illustrated in FIG. 2, only from the image of the white code bar, to the exclusion of surrounding objects whose images are outside the active region of the sensor. Of course, a similar response can be achieved by selecting an aperture 11 (or mirror) having an image-transmitting (or image-reflecting) area with a maximum dimension that is of the same order of magnitude as the image size of the code bar being detected or distinguished against the background of surrounding objects. The sensor therefore produces an average level response, as illustrated in FIG. 2, to the average surface brightness detected when the image is enlarged, by re-positioning the sensor (or aperture or mirror) relative to the focal length, to include a large sample of the background surroundings.

Referring now to FIG. 2, there is shown a graph of light intensity (and, hence, of electrical signal amplitude) versus time (or position) on an optical sensor that is effectively moved back and forth between locations 11a and 11c of FIG. 1(d). Specifically, FIG. 2(a) illustrates a peak response 19 attributable to detection of a white or reflective object located at the focal distance from the lens 9 and the base or reference-level response 21 that is attributable to detection of the average surface brightness of the object i.e. code bars and background fields in the field of view of the lens 9. FIGS. 2(b), (c) and (d) illustrate simplified responses attributable to detection of a white or reflective object at locations spaced at various distances between nearest focus and farthest focus (i.e., near infinity) from the lens 9 of FIG. 1

FIG. 2(e) represents the average response of an optical sensor to the field of view through lens 9, with no object or bar code present in the field of view. FIGS. 2(f) and (g) illustrate responses of an optical sensor to a black object (e.g. a code bar) spaced, respectively, between nearest focus and farthest focus (near infinity) of the lens 9. Therefore, an optical sensor produces positive or negative pulses of response relative to an average background intensity as white or black code bars are sensed as the focal distances are modulated over a range of distances in front of the lens 9. It should be noted that the width and amplitude of the pulse responses decrease with distance from the lens as the code bars constitute progressively smaller signal content against field-of-view background as focal distance in front of the lens 9 increases. Of course, this same varying double-pulse spacing with distance may be utilized for distance measurements using the apparatus of the present invention to modulate the focal distance of an optical system.

Figure 3:
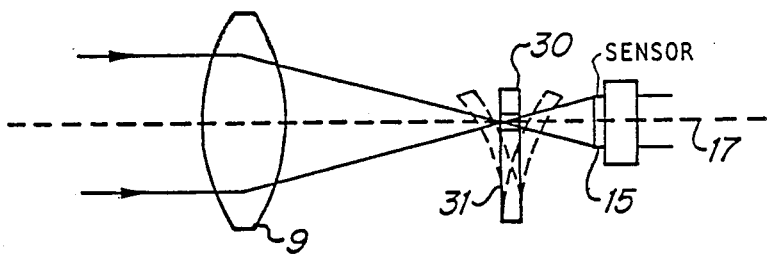
FIG. 3 is a pictorial diagram of an embodiment of the present invention in which an optical aperture is variably located along the optical axis.

Referring now to FIG. 3, there is shown a pictorial diagram of an embodiment of the present invention in which an element of the optical system alters the position, along the optical axis 17, of the image distance from a lens. Specifically, in an optical system including the lens 9, a sensor 15 and the aperture 30, the sensor (or a mirror to reflect light to the sensor) or the aperture may be mounted on a movable lever or beam 31. The positional modulation effect with a component of motion oriented along the optical axis 17 may be controlled using a known piezoelectric or electronic or electromagnetic device coupled to lever 31 under control of applied electrical signal. Of course, if a mirror is position-modulated along the optical axis 17, the optical sensor is then oriented to receive reflected light from the mirror. Alternatively, the lens or the sensor may be mounted directly on the moving beam to move cyclically back and forth along the optical axis 17.

Figure 4:
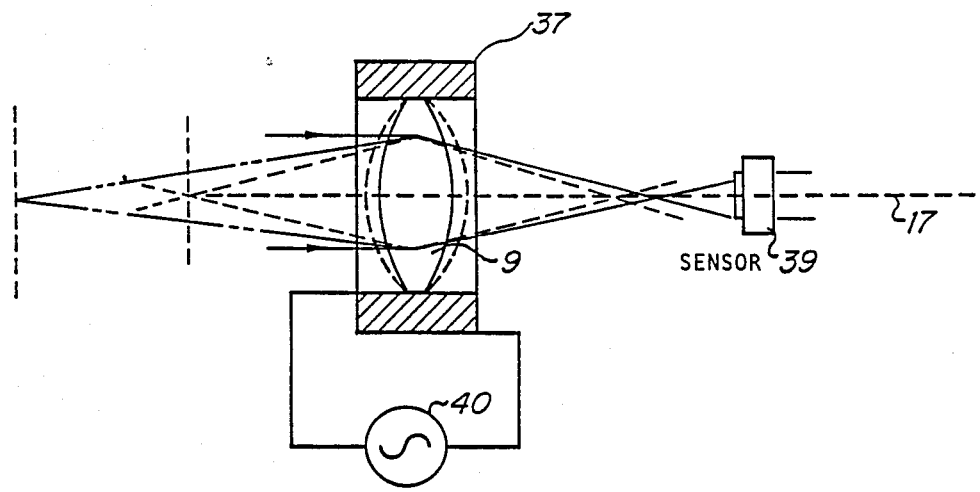
FIG. 4 is a pictorial diagram of an embodiment of the present invention in which the curvature of the lens is varied.

In the embodiment illustrated in FIG. 4, a cylinder 37 of known piezoelectric or magnetic material is snugly fitted around flexible lens 9 to distort or alter lens curvature to change its focal length under the influence of an applied electrical signal of alternating polarity. For an optical sensor 39 in fixed position relative to lens 9, this alteration of the lens 9 corresponds to a cyclic variation of the distance to an in-focus object under control of an applied electrical signal 40.

In accordance with a preferred embodiment of the present invention, modulation of the focus distance to an object may also be achieved without physically moving optical elements of the system. Specifically, as illustrated in the pictorial diagram of FIG. 5, a lineally-spaced array of optical sensors 41 are positioned along an axis 52 that is tilted with respect to the optical axis of the lens 17, so that a short optical path is established between a proximate sensor 47 in the array and a near bar-code object, and a long optical path is established between a remote, maximally-spaced sensor 43 in the tilted array and a distant bar code object. Alternatively, optical fibers having input ends disposed at successive locations along the optical axis, and having output ends aligned with different sensors in the array provides an equivalent range of long and short optical paths. In these embodiments, the plurality of sensors in the array at positions between sensors 43 and 47 are sequentially activated to effectively modulate the in-focus distance between the lens 51 and bar code objects being sensed. Thus, a black bar code positioned at the focal distance from the lens 51 will produce a prominent peak response as illustrated in FIG. 2(g) as the array 41 is scanned, and a black bar-code object positioned at a greater distance than the focal distance from lens 51 will produce a double-pulse response as illustrated in FIG. 2(f) as the sensors in array 41 that are positioned to such focal distances are scanned from both directions. Alternatively, the array of sensors may be scanned in only one direction to yield a pulse output in response to scanning through the focal length. Similar output responses are achieved, as illustrated in FIGS. 2(a-g), on white bar-code objects spaced at or away from the focal distance of the lens 51 as the array 41 is scanned.

Figure 6:
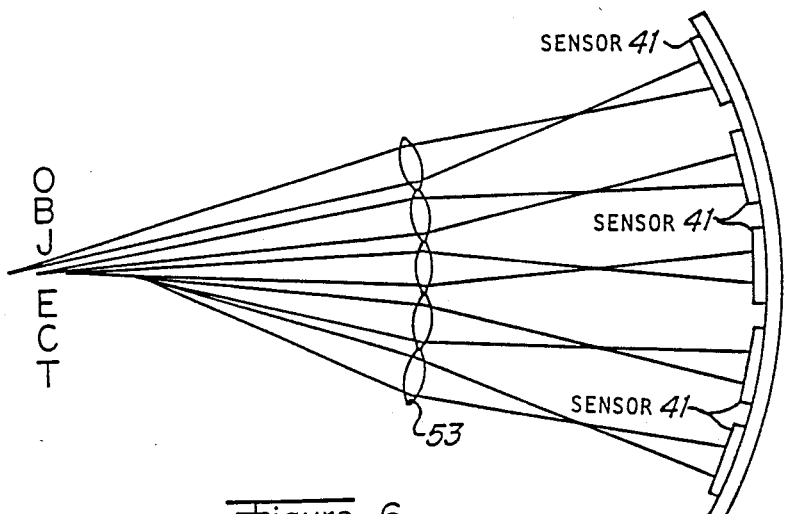
FIG. 6 is a pictorial diagram of an embodiment of the present invention including a lens system of varying focal lengths.

Alternately, as illustrated in FIG. 6, paths of different focal distances can be established through an array of lenses 53 of different focal lengths that are oriented to focus objects at varying distances on selected ones of the sensors 41. Also, the lenses 53 may have the same focal lengths and the sensors 41 may be placed at different image distances from the lenses 53.

Figure 7:
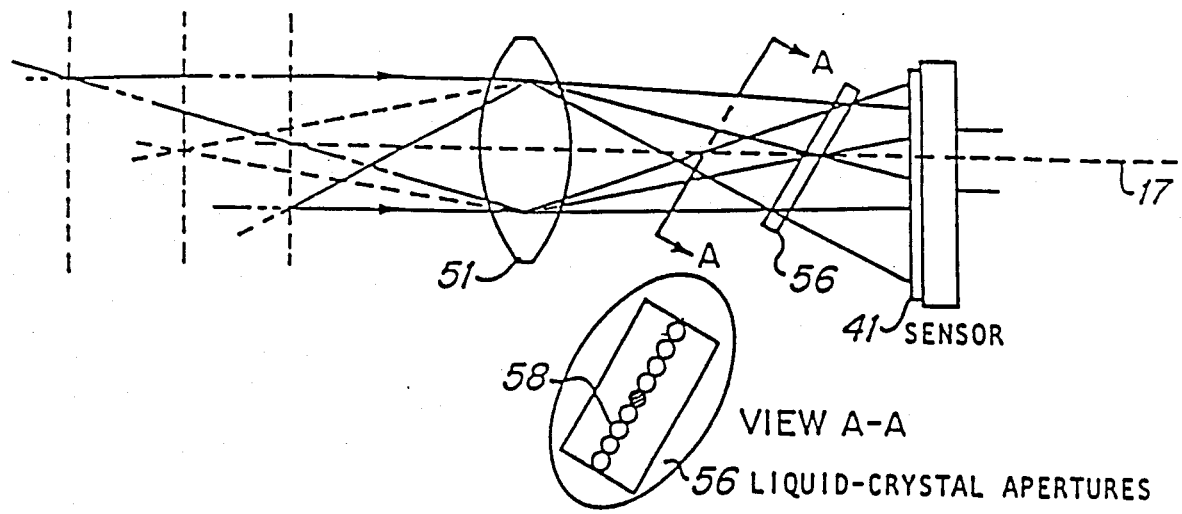
FIG. 7 is a pictorial diagram of an embodiment of the present invention including a spaced array of apertures that are tilted with respect to the optical axis.

In the embodiment of the present invention as illustrated in the pictorial diagram of FIG. 7, an array of electric-field sensitive liquid-crystal apertures 56 is interposed between the lens 51 and sensor 41 in tilted orientation relative to the optical axis 17. As is commonly known, these liquid crystal devices exhibit transparent or opaque optical qualities under control of an applied electric field. Thus, by configuring an array of apertures 56 as shown, selected ones of the apertures may be selectively rendered transparent in sequence under control of an applied electrical signal. By sequentially applying electrical signal to one cell in the array at a time, the location of the aperture 56 may be effectively moved along the optical axis in one direction or in back-and-forth scanning motion to establish different object distances for the in-focus condition.

Figure 8:
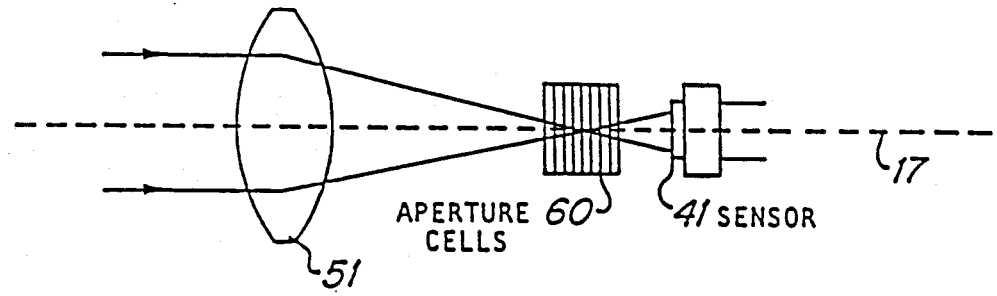
FIG. 8 is a pictorial diagram of an embodiment of the present invention including an array of controllable apertures that are stacked along the optical axis.

Referring now to the illustrated embodiment of FIG. 8, there is shown a pictorial representation of an assembly of optical elements that are arranged to vary periodically the distance to an object in front of lens 51 that is in focus. An array of apertures cells 60 is stacked along the optical axis 17. Each aperture cell includes an active aperture region of selected pattern such as circular or rectangular or elliptical slit in liquid crystal plate that is energized by applied electrical signal in cyclic sequence to form one aperture at a time while the aperture field in all other cells remain transparent. As the distance along the optical axis 17 of the active aperture varies, the distance to the in-focus object in front of lens 51 also varies.

Figure 9:
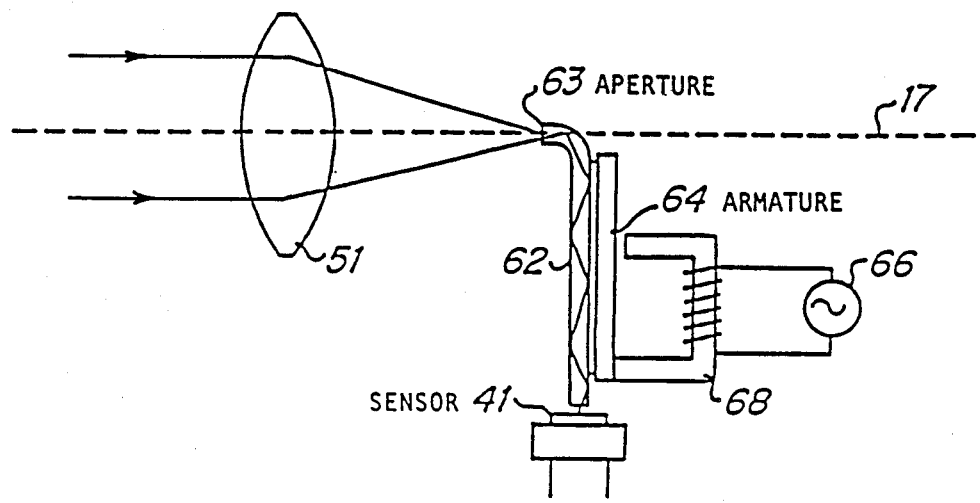
FIG. 9 is an embodiment of the present invention including apparatus for altering the effective position of the sensor along the optical axis.

Referring now to the Pictorial diagram of FIG. 9, there is shown an assembly of optical elements that are arranged to vary periodically the focal distance to objects in front of lens 51. The optical sensor 41 receives light from a fiber-optic light pipe 62, the input end 63 of which is attached to an armature 64 that is disposed to move the input end 63 back and forth along optical axis 17. By applying alternating electric signal 66 to an electromagnet 68 or to a piezoelectric device that modulates the position of armature 64 and the input end 63 of the light pipe 62, the distance to the in-focus object in front of lens 51 varies cyclically.

In each of the above-described embodiments, the distance to an in-focus object (i.e., a bar code) is varied cyclically between focal distance and a selected distance greater than focal distance in order to provide a peak sensor response as focal distance scans through the actual distance to an object, and to provide average sensor response indicative of the average ambient surface brightness of the object sensed out of focus and within the field of view of the lens. Thus, as illustrated in the perspective view of FIG. 10, there is shown a bar-code reader 70 which may be disposed at various distances 71, within a limited range, from a bar code 72 to be detected, and which may contain optical elements including lens 51, as previously described. Variations in distance of the lens 51 from the bar-code pattern 72 may occur as a result of the bar code 72 being disposed on a non-planar surface, or may be attributable to tilting of the optical axis 17 of the reader 70 with respect to the axis of relative scan motion 74 as the reader 70 traverses the bar-code pattern 72 under manual or mechanical control. Electrical signals from an optical sensor 41 within the reader 70, and electrical modulating or driving signals, where required, according to the aforementioned and illustrated embodiments are carried between the reader 70 and conventional electrical signal circuitry 76 along the signal conductors 78.

Figure 11:
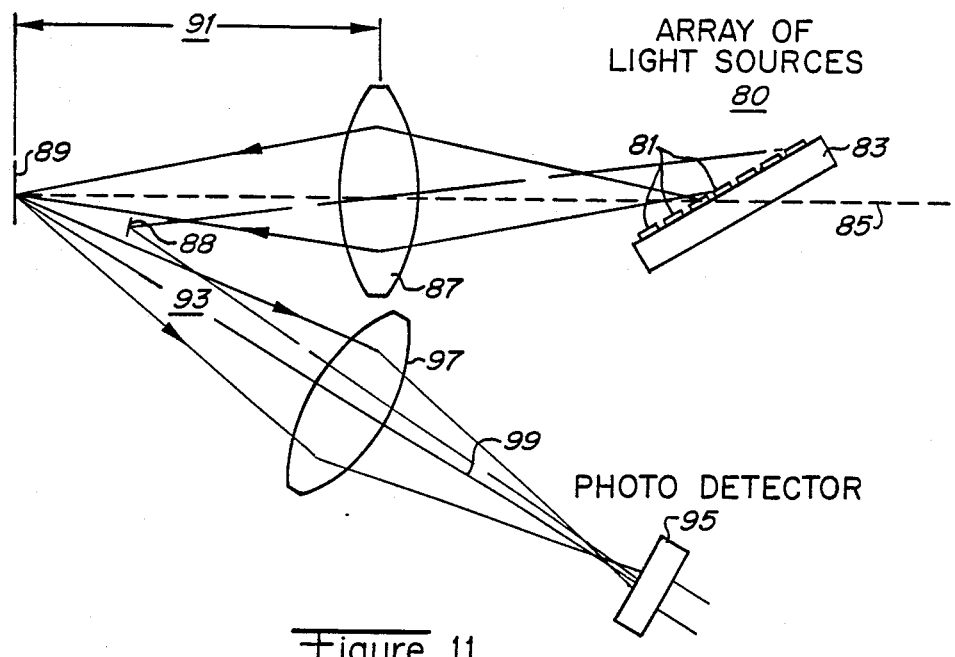
FIG. 11 is a pictorial diagram of another embodiment of the present invention employing an array of light sources.
Figure 15:
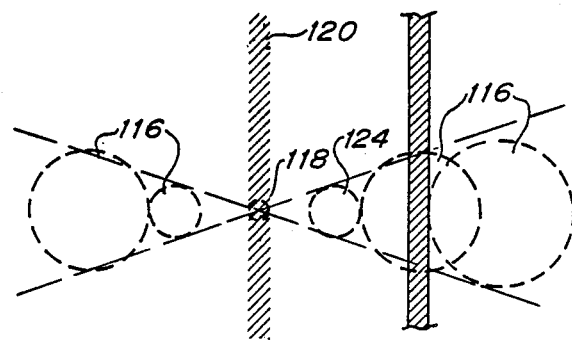
FIG. 15 is a chart illustrating the pattern of illumination of a bar code according to the present invention.

Referring now to the pictorial diagram of FIG. 11, another embodiment of the present invention is illustrated in which discrete light sources 81 are Positioned at varying optical distances from an object 89 (e.g., bar code) being sensed. The light sources 81 are arranged, for example, on a common substrate 83 which is tilted relative to the axis 85 of optical alignment of the lens 87 that is disposed between the object 89 and the array 80 of discrete light sources 81. Of course, the light sources 81 may also be separately mounted about, and at varying distances along, the axis 85. Thus, each individual light source 81 is positioned at a different distance from the lens 87 and the light flux therefrom appears as focussed at different distances from lens 87 to object 89. As each discrete light source 81 (e.g., Light-Emitting Diodes) is energized, its focussed light flux will either be in focus on an object 89 positioned at a selected distance 91 in front of lens 87, or will be out of focus at that distance 91. Ideally, the optics are selected to focus the light flux from a discrete light source 81 within an area or 'spot' 118, as illustrated in FIG. 15, having a dimension smaller than the dimension of a code bar 120 being sensed. Thus, the focussed light flux from each light source 81 occurs at a different object distance 91.

Reflected light 93 from the object 89 being sensed is received by a photodetector 95 (through an optional lens 97). This reflected light from the bar code or other object 89 includes both ambient light and light flux from the light sources 81. Energizing the light sources 81 in a cyclic sequence varies the corresponding in-focus object distance 91 in front of the lens, and this produces a corresponding change in the reflected light received by photodetector 95. Specifically, when the light flux from a source 81 is in-focus on the object 89, the dimension of the focussed light spot 118 is ideally smaller than the dimension of the feature (e.g., bar code 120 or other object) being scanned, and the portion of reflected light from the focussed light source 81 is determined by the reflectivity of the feature (e.g., bar code) 89 on which the light flux is completely focussed.

In contrast, the area 116 of the light flux from a light source 81 which is unfocused upon the object 89, has greater dimension than the feature (e.g., bar code), and the reflected light received by photodetector 95 is dependent upon the average reflectivity of the area of the object 89 covered by the unfocused light spot from a source 81. For black or dark bars upon white or light background, a change is thus produced in the reflected light level that is detected by photo detector 95 as the light sources 81 in array 80 are energized successively at their focus or non-focus locations. A reflective surface 88 may be positioned outside the solid angle of the operating optics to reflect the light from the most remote source 81 (i.e. nearest-distance focal length) directly to the photodetector 95 for calibration purposes, as later described herein.

It should be understood that the photodetector 95 may be oriented along the reflection axis 99 which is disposed at a selected angle relative to the optical axis 85 along which radiation or light from the sources 81 is supplied. Also, a plurality of photodetectors 95 may be positioned within a solid angle about axis 85 at or near which optimum reflected light flux is received. Further, it can be demonstrated that in all cases a transposition of source and detector devices yields similar detection results, and a (plurality of) light source(s) 81 may be positioned within a selected solid angle (in place of photodetector 95) about an optical axis 85, with photodetector(s) 95 positioned in place of the array 80.

Figure 10:
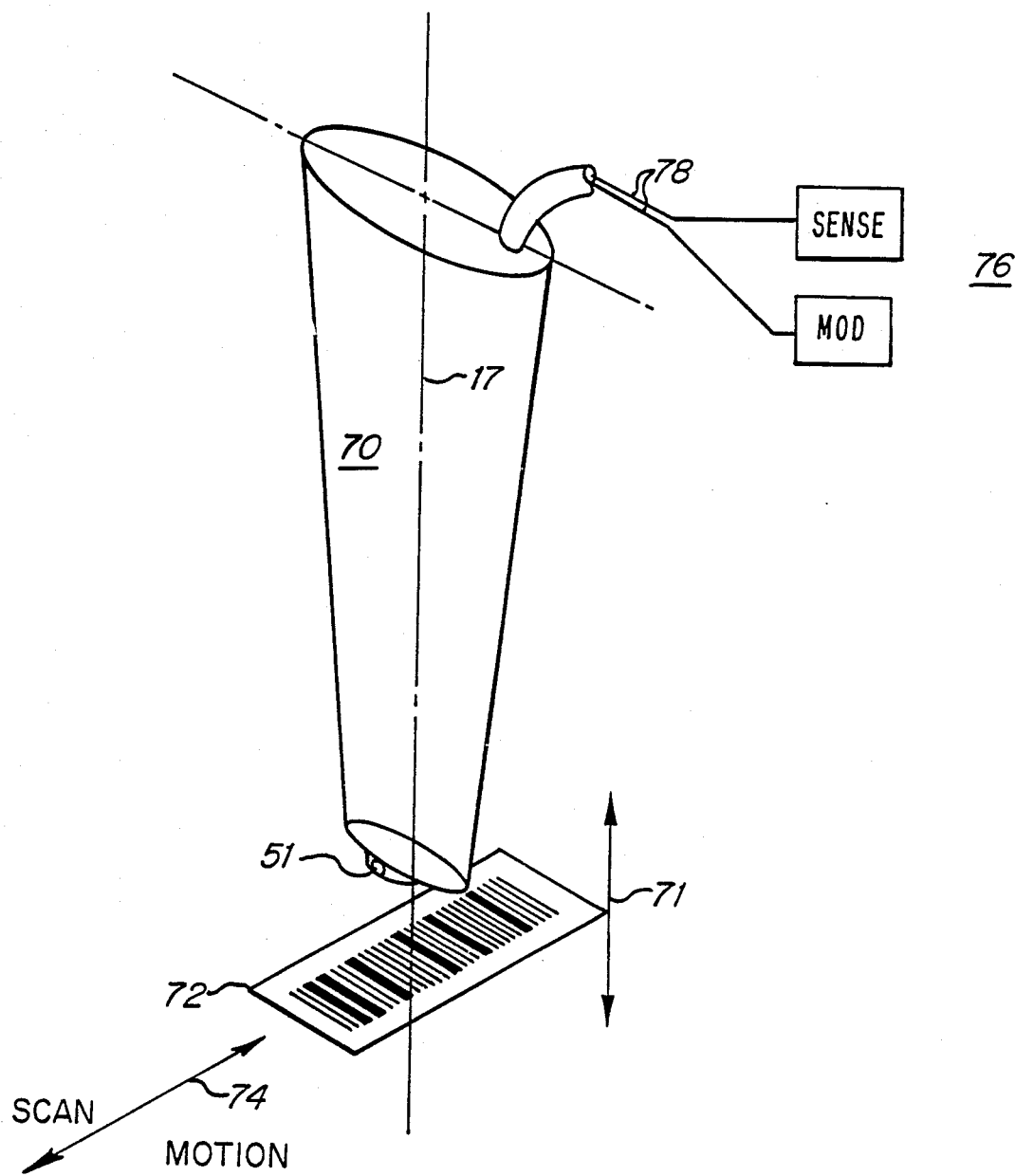
FIG. 10 is a perspective diagram of one embodiment of the bar-code reader according to the present invention.

The optical system pictorially illustrated in FIG. 11 may be assembled within apparatus similar to the type illustrated and described in connection with FIG. 10 for scanning bar codes (or other surface features or objects). More specifically, the optical and electrical systems and components of the bar-code reader may be assembled as illustrated in the side and top views, respectively, of FIGS. 12 and 13. The array 81 of at least two light sources (LED's) 81a-81b-81c is mounted on a circuit board 100 with its lens 87 along with two sets of reflection detectors, including photodetector(s) 95 *a*, (b) and the associated lens(es) 97 *a*, (b). The most proximately-located light source 81c is disposed to focus at far distance 107, and the next-to-most remotely-located light source 81a is disposed to focus at a distance 102 nearest the lens 87, and the intermediate light source 81b is disposed to focus at an intermediate distance 104. As illustrated in the top view of FIG. 13, the two sets of reflection detectors are disposed on opposite sides of the optical axis 85 of the light sources 81 and lens 87, but at different spacings relative to the focal distances of the various light sources. One photodetector 95a and associated lens 97a may be aligned along optical axis 99a to receive reflected light from an object located within the near-field of view between the distances 102 and 104, and the other photodetector 95b and associated lens 97b may be aligned along optical axis 99b to receive reflected light from an object located within the far field of view between the distance 104 and 107. In this way, each photodetector and associated lens may be disposed to operate nearly optimally over only a limited portion of the total range of spacings between the reader apparatus and the surface of the bar code being scanned. The circuit board 100 is cut out in region 106 to avoid interference with the light from sources 81, and may provide the support and circuit connections for additional circuit components, as illustrated and described in connection with FIG. 14.

The photodetectors 95a, b in the apparatus of FIGS. 12 and 13 thus produce electrical signals in known manner from the received, reflected light from sources 81, where the light from sources 81 is either unfocused over an area wider than the code bar being detected at a selected spacing, or is focussed completely within the dimensions of such code bar. Several operating parameters must be resolved to provide from such electrical outputs the requisite digital outputs that are indicative of the detected bar code. The circuit of FIG. 14 discriminates between wide and narrow code bars with respect to relative scanning motion and with respect to a given spacing between reader and bar code to provide representative output binary '1's and '0's to indicate the dark and white bars of the scanned bar code. The circuit of FIG. 14 discriminates between ambient light and the light from sources 81, and takes into account the variable distance 91 between the bar-code reader and the bar-code surface 89 being scanned. These operating parameters may be resolved by scanning the excitation of at least two light-emitting diodes (LEDs) 81 in the array 80 under control of the microprocessor 114 in the circuit illustrated in the schematic diagram of FIG. 14.

Specifically, the operating conditions discussed previously may be considered to be 'static' over a very short time interval (even though scanning motion is involved), and these 'static' conditions may be updated iteratively at high refresh, operating rates by illuminating one light source 81 at a time for a brief period, and by analyzing the resulting reflections associated therewith. Each light source (LED) 81 in the array 80 is energized by a current source 110 when selected to be energized via the multi-bit decoder 112. Multiple (64 shown) light sources 81 may be arranged in the array 80 (at locations that are effectively at the shortest focal distances, at the longest focal distances, and at intermediate focus distances) for selection by the decoder 112 under control of the microprocessor 114. Thus in an initial operating mode, several of the light sources 81 (at least two) at locations in focus and out of focus may be illuminated in sequence under control of the microprocessor 114 to produce illumination patterns as shown in FIG. 15. A case using three light sources, short of focus, at focus, and beyond focus at substantially equal central spacing will be analyzed. Each of the areas of illumination 116, 118, 124 appears sequentially on the surface 89 of a bar code, positioned at a selected distance 91 from the optics, as each light source 81 is energized in succession. The specific illumination area 118 that results from energization of a light source 81 at (or nearest) the location of focus in the array 80 is ideally smaller than the narrowest code bar 120. Thus, the reflected light sensed by a photodetector 95 during the same interval of energization of the light source 81 at the focus location is determined only by the reflectivity of the code bar 120. Ambient light reflections are essentially at a static level and can be distinguished in conventional manner. In subsequent (or preceding) intervals during the sequence of energization of light sources 81 at other locations in the array 80 than at the focus location, the resulting illumination area 116, 124 may be entirely oriented within the bar-code background, or within the background and on a code bar. Each such illumination condition has a different, average reflectivity that provides a contrasting level of reflected light back to the photodetector 95. The various levels of reflected light detected by the Photodetector 95 are digitized by A/D converter 126 and supplied to the microprocessor 114. Therefore, for a given spacing 91 between the bar-code surface 89 and the optics, the microprocessor 114 can determine which light source 81 in the array 80, when energized, is at (or nearest) the focal distance. The light sources 81 may be energized in succession at a rate of approximately 10-100 thousand lightings per second. Of course, for a different spacing 91 between bar-code surface 89 and the optics, a light source 81 at a different location in the array 80 will be determined to be at (or nearest) the focal distance. The number of light sources 81 oriented about the focal location in the array 80 may then be decreased to a nominal few (e.g., three) as such light sources 81 are energized in succession, and as the reflected light resulting from each such energization is detected and analyzed.

Figure 5:
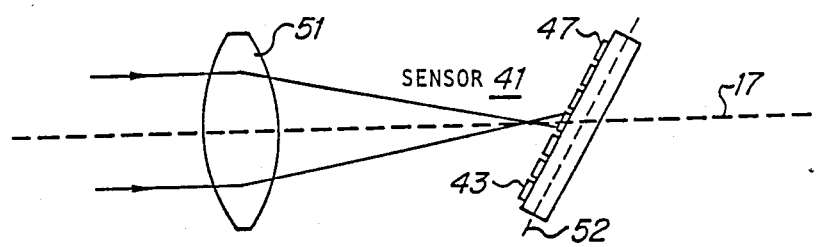
FIG. 5 is a pictorial diagram of an embodiment of the present invention including a spaced array of sensors.

The preceding description of the embodiment illustrated in FIGS. 11-13 characterizes the transposition of sources and detectors in an embodiment, for example, as illustrated and described in connection with FIG. 5. It should be understood that the sources and detectors in the embodiments of the invention illustrated and described in connection with FIGS. 3, 4 and 6-9 may also be transposed to provide reflected-light outputs which are indicative of the detection of code bars on a reference surface in response to selected focussed or unfocused illumination of the bar code by a controlled light source in a manner similar to the operation of the embodiment illustrated and described in connection with FIGS. 11-13.

Specifically, with reference to the illustrated embodiments of each of FIGS. 3-9, each controlled photodetector operating on ambient lighting may be replaced by a controlled light source and detection of the associated reflection. The movable apertures and mirrors and couplers, and the deformable lenses described in these illustrated embodiments are also operable in connection with a light source substituted for the described detector. And, in each such modified embodiment, light is supplied to, or is detected as reflected from, the bar-code surface either in focus, short of focus or beyond focus during controlled activation intervals.

Figure 14:
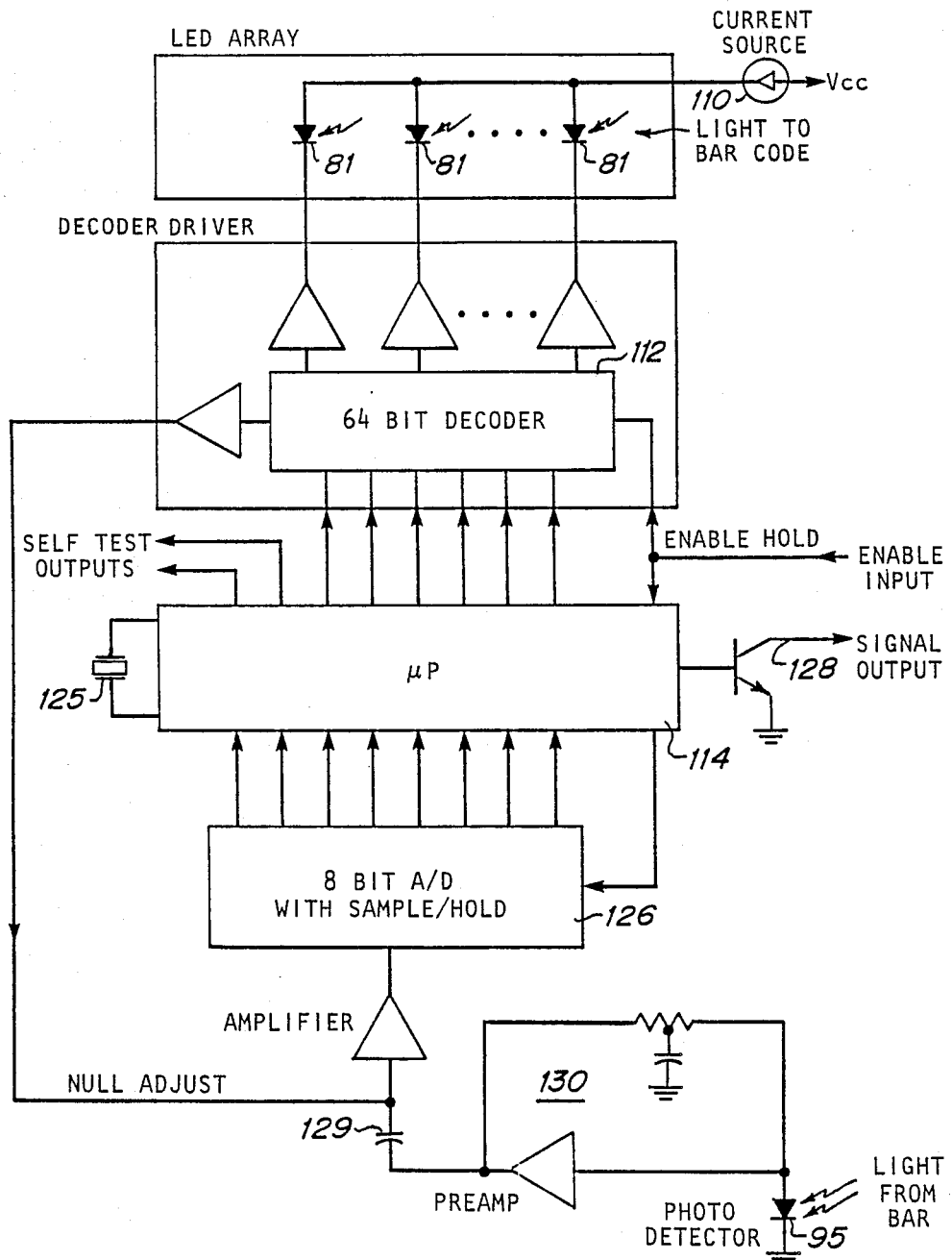
FIG. 14 is a schematic diagram of the operating circuitry of the present invention.

With reference to the embodiment of the present invention that is illustrated in FIGS. 11-13, the microprocessor 114 of FIG. 14 generally accumulates data from the light that is reflected by a bar code from the light source 81 at the focus location and at unfocused locations. In this way, data accumulated on a narrow code bar will be different than the data accumulated on a wider code bar for a given rate of relative movement between the optics and the bar-code surface 89 as the light sources 81 are rapidly energized. Of course, the scanning of light sources occurs at a very much faster rate than the rate of relative movements along the bar code, and at a much faster rate than the rate of change in ambient light levels or spacing between the reader and bar-code surface 89, so that the aforementioned operations proceed on each updated condition with movements as a new 'static' condition. A high-pass amplifier circuit 130 supplies reflection signals to the A/D converter 126 at frequencies above the flicker rate of ambient light. The microprocessor 114 thus accumulates data on code bars that are representative of the sequence of narrow and wide bars encountered with relative movement over the bar code on surface 89, and provides a digital output signal 128 indicative of the scanned bar code. Since the difference between the widths of narrow and wide code bars is established to be of the order of 2 to 1 to 5 to 1, slight variations in scanning rate over the entire bar code may produce representative data on narrow and wide code bars that vary slightly from such expected range of difference, but that do not vary sufficiently to lose distinction between the wide and narrow bars. More specifically, the detector signals that are derived either from focussing an array of light sources (or equivalent) onto a bar code and detecting the reflected light, or from imaging the bar code on an array of detectors (or equivalent) are processed in such a way as to recreate a digital representation of the scanned bar code, independent of the distance between reader and bar-code surface.

Several factors must be considered in processing the detector signals, including: (a) the start of the bar code; (b) the type of bar code; (c) angular orientation of the bar code with respect to the orientation of the array of light sources (or detectors); (d) scanning directions; (e) widths of narrow and wide code bars; (f) number of bars constituting the entire bar code; (g) scanning speed; (h) spacing or distance to the bar code; and (i) angles of incident and reflected radiation with respect to the surface of the bar code. A few operating factors or conditions are known or can be readily determined, including (a) the standard ratio of widths of wide and narrow code bars; (b) a bar must be preceded and followed by a background reflective surface (i.e. quiet zones); (c) a bar has a certain reflectivity; and (d) there is a minimum time required to scan the narrowest bar (i.e. minimum bar width at maximum scanning speed). These factors and operating conditions are taken into consideration in the operation of the microprocessor 114 and associated circuitry in FIG. 14 according to the operating routine illustrated in the chart of FIG. 16 a, b.

In brief overview, the microprocessor 114 and associated circuitry operate to collect and store separate data for each activated detector or light source associated with a different focal distance. The reflection magnitude associated with an activated device is digitized and stored, and the same procedure is repeated in rapid, timed succession for each individual device during one scan of the array of light sources or detectors as the device scans along a bar code. Then, the process is repeated and the new data is stored for each device in rapid, timed succession. The data thus collected with time (and scanning motion) is monitored to determine: (a) the detector or source device(s) with the largest data difference or signal modulation (indicating change of conditions from focus on a bar to other conditions); (b) signal threshold levels; (c) the time between threshold crossings; and (d) the relative positions of detector or source device(s) on the bar code being scanned. On the basis of the largest signal modulation or spread of the collected data (i.e. 'white' to 'black' detection), the appropriate detector or source device(s) are then chosen around the in-focus device(s) (or the nearest thereto) in the array. It should be noted as previously mentioned, that one or more of the source or detector devices at an end of the array can be positioned as illustrated in FIG. 11, with respect to a direct, reflective surface 88 to produce a calibration source for system test. A 'zero' or reference-level response at selected intervals during the successive activation of such array of source or detector devices can be produced by turning off the source. The reference-level response thus produced is representative of light output and detector sensitivity independently of an bar-code surface 89, and can be used to zero the operating parameters of the circuit in conventional manner. Also, it should be noted that if the magnitudes of the responses associated with a device 'ahead' of the device at the focus location (i.e. ahead or leading in the direction of the scanning motion) and associated with a device 'behind' the device at the focus location (i.e. behind or lagging in the direction of the scanning motion) are both greater than the magnitude of the response from the device at (or nearest) the focus location, then the focus device may be picking up 'noise' from media or printing defects. The effects of this noise can be eliminated by (a) sampling the bar code at a different vertically-oriented scanning position along the bar code, or (b) sampling the bar code using a different illuminating source (or photodetector) focused to cover a wider area. If the alignment of the sources (or photodetectors) is not perpendicular to the bar code, then switching from one device in the array to another induces a vertical shift in the scanning position on the bar code, thereby potentially eliminating a source of noise. In addition, switching from one device in the array to the other causes a focus shift which in turn alters the size or area of illumination (or detection). Such an increase in area reduces the noise attributable to a small media or printing defect in the region of the bar code being scanned.

Note, however, that focus changes should only occur on narrow bars, since all source or detector devices close to the focus device are in 'focus' on wide bars, as determined from the magnitudes of device responses.

If it is determined in the above manner that the lagging device is at the focus location, then the new device at the focus location is initialized to establish the new magnitude of response (i.e. new focus condition on the black/white bar reflectivity). If the focus device thus tested does not change, then the accumulated data is checked to determine if an output representative of the detected bar should be digitized as a representative binary '1' or '0'. If it is determined that the leading device is at the focus location, then a representative binary output is produced from the existing data on the magnitude of response of the device at the focus location. This device is initialized (i.e. new focus condition on the black/white bar reflectivity) as the new device at the focus location. When any representative bar-code output is produced, the circuitry operates to locate the next color (i.e., white) that is expected at the focus location in preparation for detection of the next transition on a new black bar, and so on in the scanning of the entire bar code.

Figure 16A:
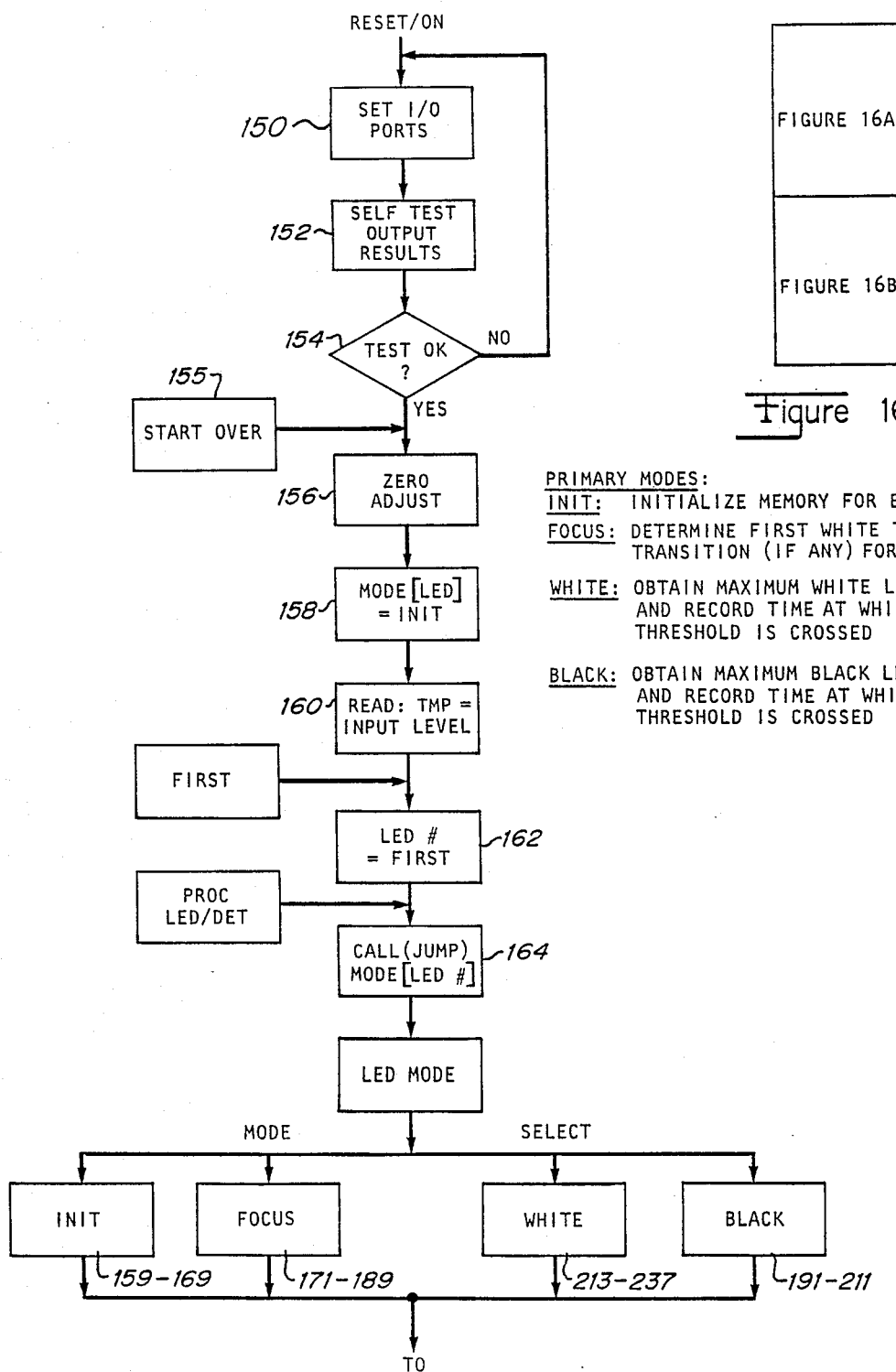
FIGS. 16, 16a, b comprise a chart illustrating the operating routine of the present invention.

More specifically, with reference to the chart of FIG. 16 a, b, upon initial turn-on or reset, the input and output ports of the microprocessor 114 are set 150 and various conventional self-test routines including tests of RAM, and the like, are executed 152, and the results are evaluated 154 to determine whether the microprocessor 114 is working properly. If this turn-on or reset routine is successfully executed, then upon initial operation, (or after starting over 155 as later described), the circuitry operates in the 'zero adjust' routine 156. The 'zero adjust' routine operates to null the detector circuitry on the average ambient level of reflected light, and this is accomplished by storing charge on the coupling capacitor 129 equivalent to the magnitude of the detected average reflected background light with no light source (LED) 81 actuated. Thereafter, the A/D converter 126 only quantifies detected reflections attributable to an actuated light source 81.

Here, it should be noted that the present invention operates as a state machine and every LED that is activated has certain operating characteristics associated with it. There are four operating characteristics that can be an operating state for an LED light source. The first state is 'initialize' including initializing the memory for each LED in use. The second state is 'focus' wherein an LED is beginning to come into first focus on a code bar and the initial threshold levels must be determined, and the remaining two states are 'white' wherein the maximum white level is detected and the white-to-black threshold crossing is recorded in time, and 'black' wherein the maximum black level is detected and the black-to-white threshold crossing is recorded in time. Each LED light source thus has four operating states of operation each time the circuitry cycles to the activation thereof in the operating sequence.

Therefore, the LED light sources are set to the 'initialize' state or mode 158, and the first detected input level from each is determined by reading the first input level digitized or quantified by the A/D Converter 126, and by storing that quantified reading in a temporary register (not shown here, but described later herein with respect to the 'mode selects').

Figure 17:
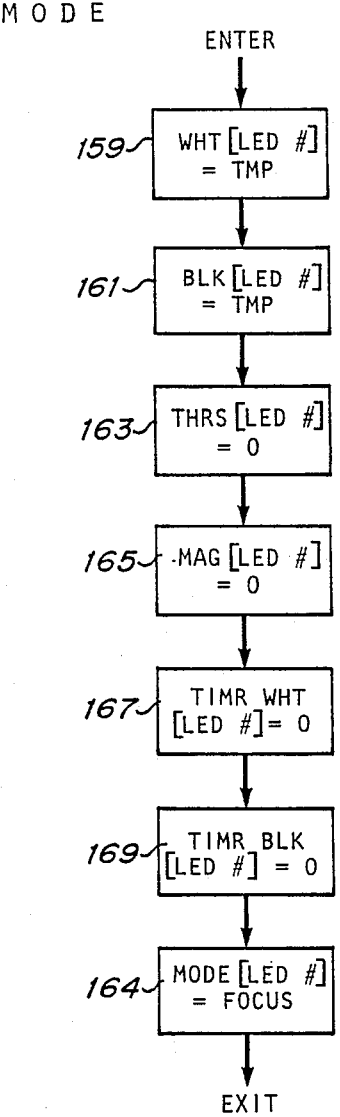
FIG. 17 is a chart illustrating the INITialize mode of operation in the routine of FIG. 16.

More specifically, with respect to the logically first LED light source operating in the 'initialize' mode, as illustrated in FIG. 17, the detected reflection is detected, digitized and stored 160 as a temporary value. This temporary value of the detected reflection serves as a temporary value of the 'white' level 159. When the bar code reader is initially positioned, it is over a white or 'quiet zone' portion of the bar code. In addition, the 'black' level is also set equal to such temporary level 161. A more representative (darker) black level is anticipated the next time the same LED is activated, and the operating routine directs that any detected level which is less than the current black level is the new black level. Therefore, any subsequent level that is less than this initial white level (and also the initial black level) will become the new black level. The threshold level is also set to zero 163 because no other threshold level is available yet. The magnitude (MAG of black-white differential) is also set to zero 165 because the difference between the black and white levels is not yet known. The timers are also set to zero because the first black bars haven't been detected yet. There are two timer registers, one for white bar and another for black bar, and both are set to zero 167, 169.

In the sequence of operating states involved, other LED's will also be activated in turn and the resulting detected reflections will be analyzed in the manner described herein.

Figure 18:
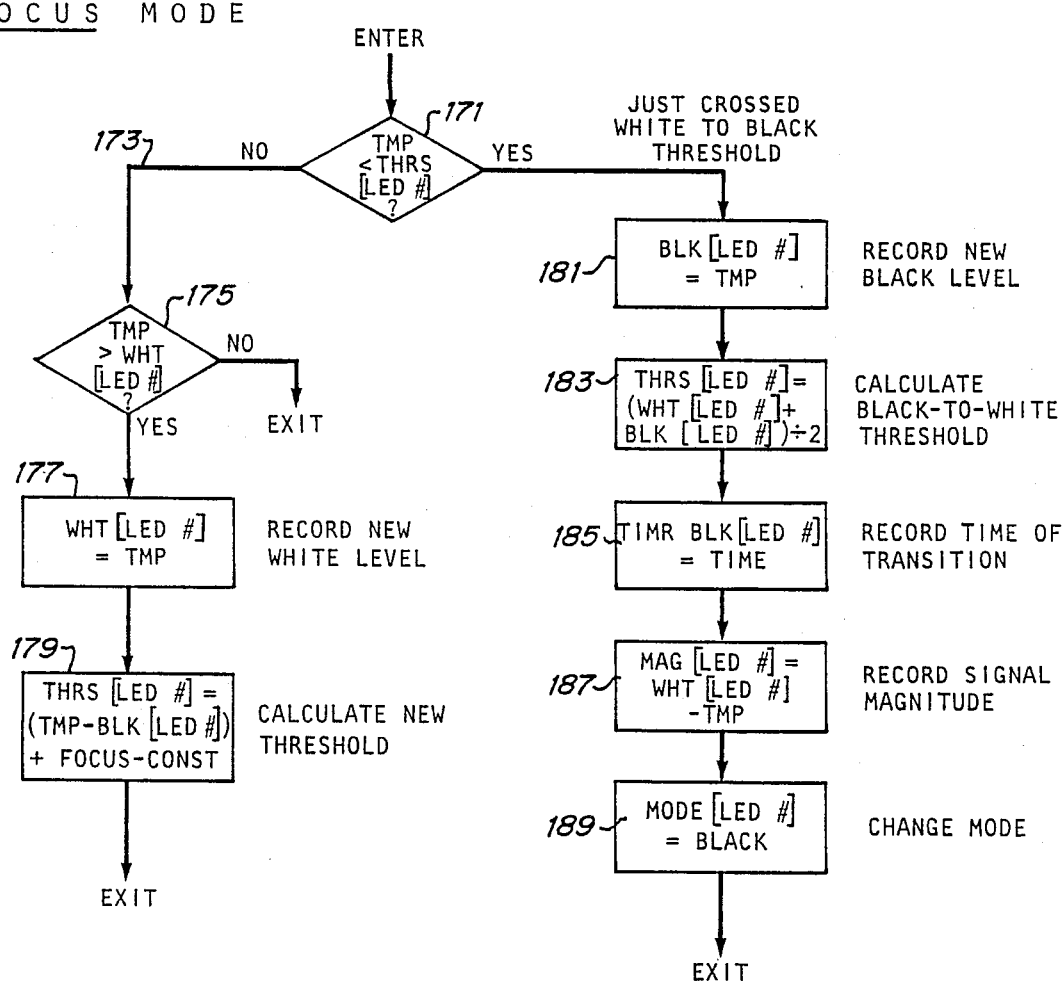
FIG. 18 is a chart illustrating the FOCUS mode of operation in the routine of FIG. 16.

At the end of the 'initialize' mode of operation, the circuitry jumps 164 to the 'focus' mode, as illustrated in FIG. 18, for the same LED. The temporary value that was stored 160 in response to activation of the initial LED is tested 171 to determine whether this temporary value is less than the threshold value (initially, it cannot be less than threshold because the threshold is set to zero). The decision 173 is NO, and the next test 175 determine whether the white temporary value is greater than the 'white' level 159. The decision is either YES or NO. When the circuitry is first turned on (or reset), the reader may not be positioned near a reflective surface 89 to detect any white level (i.e. it is actually detecting black). As the reader approaches a reflective surface, the detected reflection will include contribution from the surface and the detected value will eventually exceed the 'white' level previously established (at zero value), and such zero value will be replaced 177 by the new 'white' level value from this LED. (Note that a new 'white' level may only occur in a subsequent activation of this one LED). Also, a new level for 'threshold level' can now be calculated 179 as the new 'white level' minus the 'black level' times a focus constant (which may be determined experimentally as a factor close to the maximum 'white level' since as the reader is positioned closer and closer to the reflective surface, the 'white level' from the background is the ambient reflection level that has to be constantly subtracted out, or constantly 'zeroed' as the detected reflections get closer to the 'white level').

Eventually, the maximum 'white level' is attained as the reader is positioned close to the reflective surface, and the background doesn't get any lighter. With maximum 'white level' established for a given LED, the next event is likely the approach to a code bar being scanned. As this first black bar is approached, the temporary value (each time the given LED is activated in sequence) will decrease because the detected reflection includes the black bar in the field of view. If the decrease is sufficient (e.g., if the given LED is close to focus), the temporary value will decrease below the threshold level 171, and a transition occurs from processing in a white area to a black area.

This temporary value is now stored 181 in another register as the 'black level' for that LED which becomes a new 'black level' from which to compare subsequent black levels to obtain a black peak for that LED.

Also, a new threshold level is calculated 183 as the average of the 'white level' and the 'black level,' and the present time is recorded 185 when the detected reflections crossed into this 'black level.' In addition, the magnitude (i.e., the difference between the 'white level' and the temporary value) is recorded 187 so that the 'best-focus' condition can be determined, as later described herein. The 'best-focus' condition is the LED, or detector, that shows the highest magnitude of difference between the best black and best white levels).

Figure 19:
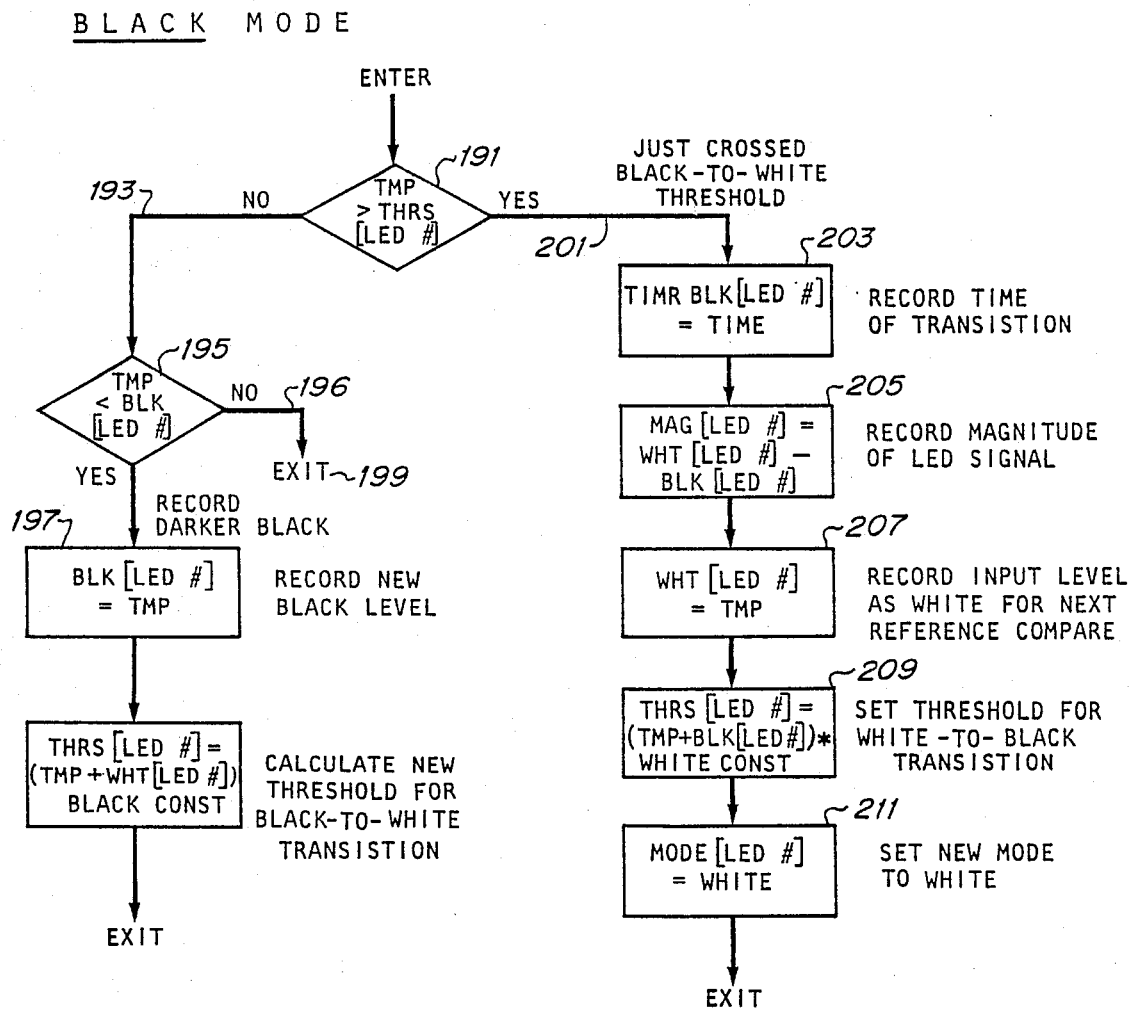
FIG. 19 is a chart illustrating the BLACK mode of operation in the routine of FIG. 16.

Having thus detected the first black bar, the circuitry changes operating mode 189 to operate in the 'black' mode, as illustrated in FIG. 19. Thus, the temporary value is now tested 191 to determine whether or not it is greater than the threshold value that was previously established. Likely, the detected level probably still is not the blackest black, but in fact is still moving toward the blackest 'black level', therefore this level is not greater than the threshold value, and the determination 193 is NO. The temporary value is tested 195 to determine whether or not it is less than the last established black level. If YES, this new level is stored 197 in a separate register and a new threshold is calculated as the temporary value plus the 'white level' times a 'black' constant for establishing the black-to-white transition. Note that the detected reflections for the given LED (or detector) which is activated each time in the sequence are tested in this manner until eventually the temporary level represents the blackest black. Summarizing, the temporary value is tested 191 to determine whether it has crossed the threshold value, and if not 193, it is tested 195 to determine whether it is less than the current black level. If NO. 196, the 'black' mode routine for the given 'LED' is exited 199 until the next occasion when such LED is activated in sequence.

At some point, the detected reflections for a given LED get brighter or whiter again because of movement off the black bar. Thus, when tested 191, the temporary value exceeds the threshold value (perhaps one cycle later or several hundred cycles later), and the test response is YES 201. The time at which the transition occurred is recorded 203 and the difference between the old time and the new time is an indication of the duration of scanning movement on the black bar.

It should be noted that such time of events can be recorded as the number of times the given LED was activated at the clocked operating rate of the microprocessor 114 and associated circuitry (controlled by crystal oscillator 125). Alternatively, the time of events can be recorded by subtracting the absolute time of the current threshold crossing from the absolute time of the previous threshold crossing.

After the time of transition from black to white is recorded 203, the magnitude or modulation is calculated and stored 205 as the difference between the 'white level' and the 'black level'. The temporary value is stored in the 'white level' register 207 to serve as a reference in the next cycle in which the 'white level's can be compared. Also, the new threshold value is calculated 209 as the temporary value plus the 'black level' times a 'white' constant for establishing the white-to-black transition. Thereafter, the operating mode of the microprocessor 114 and associated circuitry operates in the 'white mode' 211, as illustrated in FIG. 20.

Figure 20:
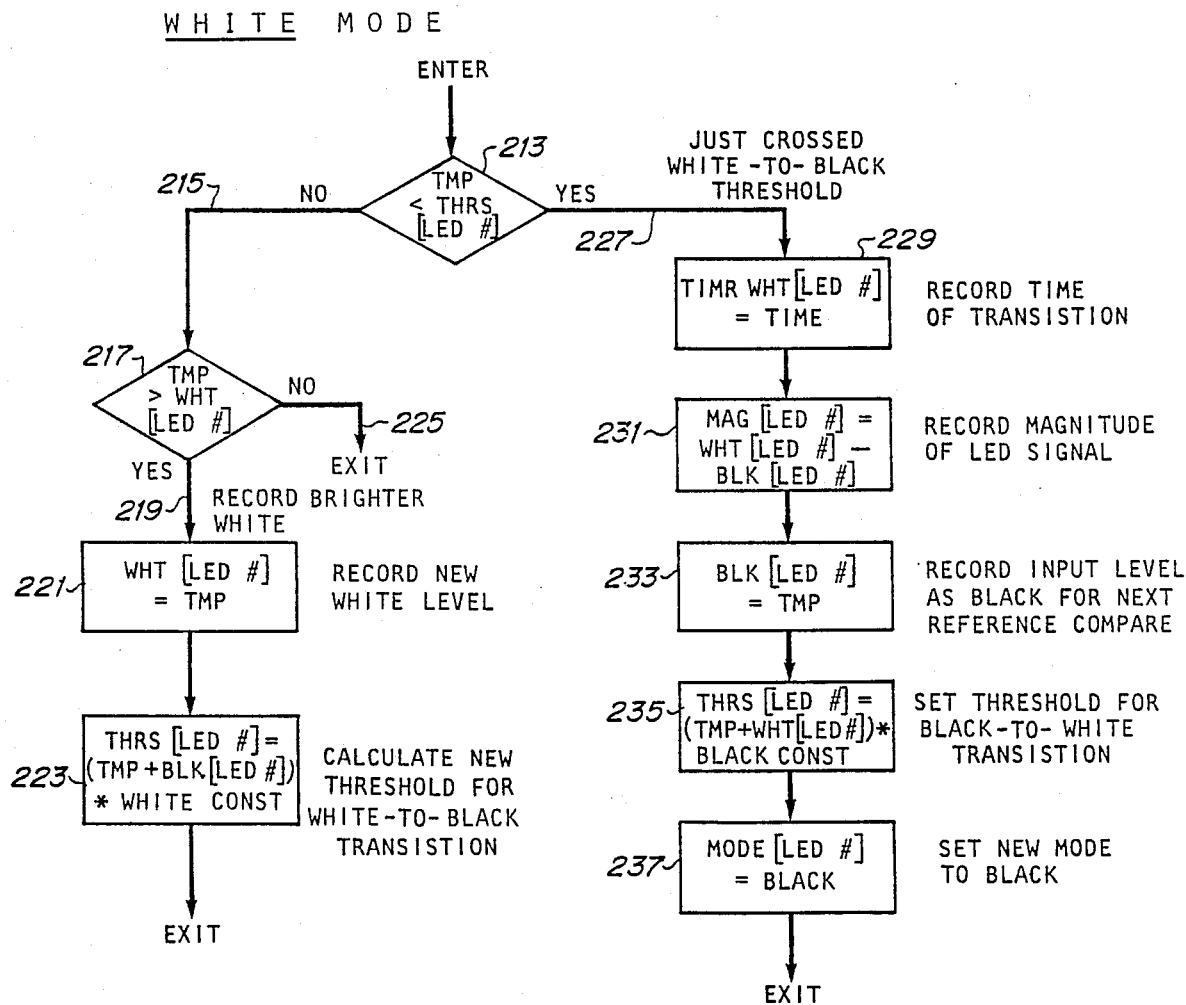
FIG. 20 is a chart illustrating the WHITE mode of operation in the routine of FIG. 16.

Referring now to FIG. 20, the temporary value is tested 213 to determine whether or not it is less than the threshold value. Initially, the test response is NO 215, and the temporary value is then tested 217 to determine whether it is greater than the previous 'white level', and if so (YES 219), then the temporary value is stored 221 as the new 'white level'. Also, the new threshold value is calculated 223 as the temporary value plus 'black level' times a 'white' constant for establishing the threshold for white-to-black transition. If the temporary value is tested 217 and determined not to be greater than the previous 'white level', this operating mode is exited 225 until the given LED is again sequentially activated. This operating mode continues each time the given LED is activated until the maximum 'white level' is attained. Once the maximum 'white level' is attained, the response to the test 213 of whether the temporary value is less than the threshold value will be YES 227, and the time of transition is then recorded 229, and the magnitude of the difference between the 'white level' and the 'black level' for the given LED is calculated and stored 231 in a separate register. Also, the temporary value is recorded 233 as the 'black level' for subsequent reference comparisons, and a new threshold value is calculated 235 as the temporary value plus the 'white level' times a 'black' constant for establishing the threshold for black-to-white transitions. Thereafter, the microprocessor 114 and associated circuitry shifts to operation in the 'black' mode, as previously described in connection with FIG. 19.

Figure 16B:
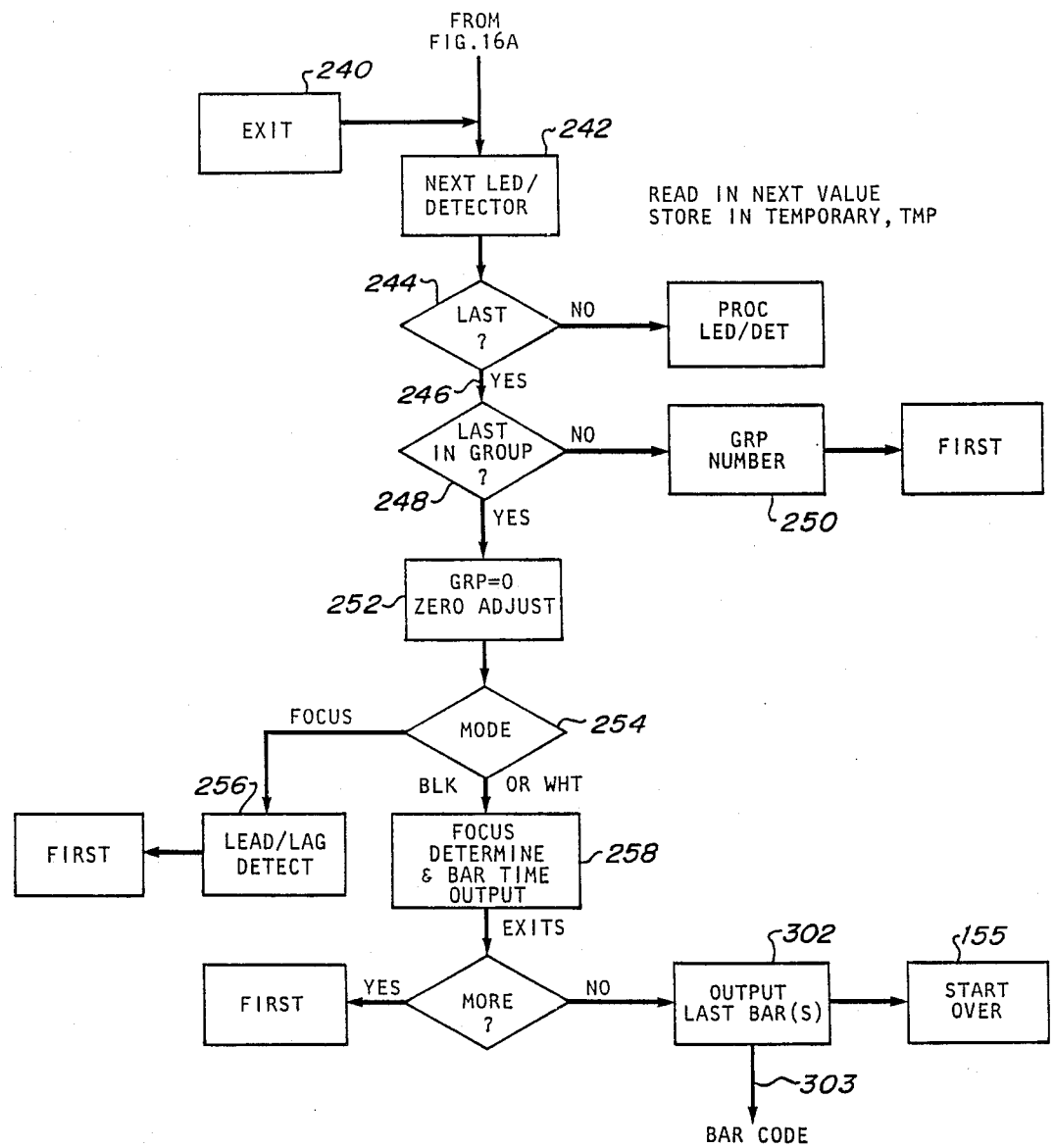

It should be noted that each exit from a routine as described in connection with FIGS. 17-20 returns operation to the 'EXIT' stage 240 in FIG. 16b, after which the next LED (or detector) 242 state follows. In that state, the next temporary value of detected reflections for another activated LED (or detector) in the array will be stored, tested and analyzed, as previously described.

In this manner each LED (or detector) is activated in timeshared sequence as operation through the aforementioned routines proceeds for each LED (or detector) and until the inquiry 244 about last one is YES 246.

If the last LED (or detector) was processed, it must now be determined whether enough time slots were processed to permit 'zero adjust' 156 of everything again, and to permit production of appropriate outputs representative of the code bars detected.

In one embodiment, a group number is recorded (i.e., the 1, or 2 or 4 or n number of times through the routines) up to a limit 248 before resetting to zero adjust 156 and producing an output of the code bars detected. Thus, the group number is incremented 250 by one each time the array of LEDs is sequentially activated. Eventually, the group number limit is exceeded. The group number can then be reset to zero 252, and the 'zero adjust' mode 156 is initiated. In another embodiment, the light source is pulsed during each sequence and the off time is used for zero adjust.

Next, the accumulated data is tested 254 to determine whether or not a given LED operated in focus on a bar and to determine the new focus on the bar.

If in focus mode, the lead/lag detection 256, or if in the black/white mode, the Focus Determine and Bar Time Output mode 258 can be modes of operation just like the modes illustrated in FIGS. 17-20 for selection following the mode selection 164.

However, in the illustrated embodiment, after activating a number of LEDs and detecting and storing the digitized values of reflected light therefrom, singly or in grouped routines, as previously described, the data is then analyzed to determine which of the signals represented the best focus, and whether there is enough data to output to a storage buffer.

For purposes of simplicity, the data associated with three LEDs may be analyzed to determine the greatest magnitude of detected reflections therefrom. Also, for purposes of simplicity, one such LED is considered as currently at the focus location, one LED is in the lagging location (relative to the direction of scanning motion) behind the focus LED, and one LED is in the leading location ahead of the focus LED. Therefore, the first analysis of the data in the Focus Determine and Bar Time Output 258, as illustrated in FIG. 21, is to check 261 the magnitude data to determine whether the magnitude of the focus LED is greater than or equal to the magnitude of the leading and lagging LEDs. If so 263, there is no reason to change the focus LED. Rather, the data is then analyzed to determine whether an output should be produced to a storage register, and what value of output (i.e., representing a black or white bar) should be produced.

Therefore, a specific LED referred to as the focus LED for simplified analysis should produce an output. For this purpose, it is important to know what the previous output was (i.e., black or white bar), or, more specifically 265, what is the next value? If the next output is going to be a black 267 bar (which is the case, for example, when starting up on white surface), then the data is tested 269 to determine whether the time at which a 'white level' occurred is other than zero (at first start up, the time of 'white level' is initialized to zero).

In the first few iterations of the routine, the test response will be NO and result in Exit 271 from the routine of FIG. 21 to the routine illustrated in FIG. 16. Therefore, no output of a 'black level' is produced until a 'white level' occurs.

Assume for simple analysis that both a 'black' time and a 'white' time greater than zero are present. This produces an output 273 of the 'black' time to a storage buffer, and resets 275 the 'black' time equal to zero, and sets the next mode 277 to produce an output on a white bar.

For purposes of simple analysis, assume that the data for all activated LEDs, and the transition times for the group of LEDs have been analyzed, and the routine is to be repeated. By checking the magnitude 261, the magnitude for the focus LED is still greater than the magnitudes of both the lagging and leading LEDs 263 and the NEXT bar 265 equals white 266. The data is tested 268 to determine whether the time at which a 'black level' occurred is other than zero. If it is not, no new black bar occurred, and the routine is exited 271. If the data tested is greater than zero, then a black bar occurred and an output of a white bar can be produced. The white time is set 281 equal to zero, and the NEXT output 283 is set to black.

An output that is representative of the detected black or white bars may not be produced immediately because it has not been determined whether or not the leading LED or the lagging LED furnished data from a better focus location. It is possible that each of the leading and lagging LEDs will be positioned to provide reflected light from an individual bar, or that the leading LED may not be positioned on a bar ahead of the bar on which the focus LED is positioned. Similarly, the lagging LED may be positioned on the same bar on which the focus LED is positioned. Therefore, it is desirable to analyze the data for the leading and lagging LEDs by comparing the data for the lagging LED with the data for the focus LED to determine whether or not an output representative of a bar should be produced from the data for the focus LED or from the data for the lagging LED. It should be noted that in initial operation, the LED that first detects a black bar becomes the leading LED, and determines the LED with respect to which the leading and lagging relationships are established.

Assume for simplified analysis that when the data are tested 261, the lagging LED has the most or greatest modulation 285. Then, it is desirable to shift operations 287 to establish the lagging LED as the focus LED. The focus LED therefore becomes the leading LED, and a new LED is included to operate as the lagging LED. The time register for the new lagging LED is set to zero. With the new focus LED established, the data is tested 289 to determine whether the next output (relative to the previous output) must be a white bar or a black bar, and in either event, the time at which the transition occurred from black-to-white or white-to-black is set 291, 293 to zero. Thus, if an output on a black bar is expected next, the 'white' time for the new focus LED is set 291 equal to zero because such 'white' time has already produced an output. Similarly, if an output on a white bar is expected next, then the 'black' time is set 293 to zero because such 'black' time previously produced an output.

Assume again for simplified analysis that when the data are tested 261, the magnitude of the leading LED is greater 295 than the magnitude of the focus LED and of the lagging LED. Since the LED position is effectively going to be moved ahead a bar, the circuitry prepares to produce an output from the old focus LED, depending upon whether the next bar 297 (relative to the previous bar) must be a black bar or a white bar. In either case, it is desirable to shift operation 299, 301 so the leading LED becomes the focus LED, the old focus LED becomes the lagging LED, a new leading LED is included, and the time register for the new LED is set to zero. If an output was previously to be produced from the focus LED on a black bar, an output of a white bar is now produced from the new focus LED. This results in producing double bar outputs because an output representing a black bar is produced from the old focus LED and a white bar output is produced from the new focus LED. Similarly, if an output was previously to be produced from the old focus LED on a white bar, an output representing the white bar is produced from the old focus LED and a black bar output is produced from the new focus LED. The time registers are then set to zero, and this subroutine exits to the routine illustrated in FIG. 16. Therefore, when the operation shifts forward to a new focus LED, outputs representative of two bars are produced, and when operation remains on a focus LED, an output representative of a bar may or may not be produced, depending upon whether an output was ready to be produced. And when the operation shifts backward or behind, no output is Produced. Such outputs may be stored in temporary storage registers to be taken out at a rate as required in order to provide a continuous output 303 representing the scanned bar code. Alternatively, it is also possible to accumulate data representative of the detected bar code reflections and supply such data to another microprocessor which may bit-map the data or otherwise operate on it in accordance with a suitable algorithm to look up the data patterns and thereby decode the bar code.

There are operating conditions under which the registers for storing data per LED may overflow, meaning that useful data is no longer being accumulated. Under such conditions (e.g., end of the bar code) it is desirable to output the last bars that were in storage. Also, if the bar-code reader is being moved away from or toward the reflective surface, that motion results in moving much faster in number of code bars being detected because of an effective offset introduced into the data attributable to such spacing changes. Certainly, it is not desirable to lose a bar or sense extra bars as the bar-code reader is positioned relative to the reflective surface. For example, as the reader is positioned away from the surface, the effect is similar to remaining at the same spot on a bar in the scanning direction. Similarly, as the scanning motion is slowed down, it is desirable not to have gaps in the output of code bar detections. Therefore, it is desirable to have enough code bar outputs stored in memory to provide continuous outputs representative of the bar code being scanned, and not outputs that are representative of the movement of the reader up and down relative to the reflective surface, or representative of the associated shift in focal position of a light source. Therefore, the Output Last Bar 302 may include a memory register that is written into and read from at asynchronous, separate rates as the routine proceeds and starts over again.

The microprocessor 114 includes memory registers (in hardware or software) for storing the operating data in a ring-type buffer for first-in, first-out operating mode. Data of the type described above may be supplied constantly to such registers. For example, the first data is put in when a transition time occurs to represent a 'black' time. Thereafter, a 'white' time input is supplied to the register which is retained until a 'black' time input is supplied.

Referring now to FIG. 22, there is shown a chart which illustrates the operation of the present invention in the case of shifting from the focused LED being the one in focus to the lagging LED being the one that is in focus. (The light pattern 304 from the LED that is in focus in shown as the smallest spot size, where M is magnitude or modulation, W is White, B is Black, and the 1's, 2's and 3's are the various light spots from LED's being analyzed, 1 being the leading LED, 3 being the lagging LED, and 2 being the LED that starts out initially as the focus LED). Assume for simplified analysis that all three LEDs, upon initial operation, are proceding from a white reference area at the beginning of a bar code, and therefore are all at the same magnitude. It is not yet known which LED is at the focus location. Since all the LED's are effectively at the focus location in the beginning, the operating routines previously described always determines which LED is best focused on the first black bar 305 that is being crossed over in the scanning motion. In this first case represented on line 1 of the chart, LED 1 has just crossed from the white to fully within the black. The magnitude $M_1$ is relatively a value 10 and the time of crossing is relatively a value 3. None of the other two LEDs have crossed the bar 305 yet. All of the LEDs show the same modulation ($M_1, M_2, M_3 = 10$).

In the next case represented by the second line, LED 1 crossed from black into white, and new values are determined, namely B1 is 1 and modulation is 10. LED 2 just crossed from the white into the black so its white value is relatively 3. LED 3 is lagging LEDs 1 and 2 as no new data is available. Shifting to a focus LED is accomplished in response to the highest modulation on one of the LEDs. Since the modulations are equal, no change to a focus LED takes place.

In the next case represented by the third line, LED 3 crossed from the white to the black, so three LEDs have made the transition. Also, LED 2 crossed from black to white, so W1 is now 1. Also, the leading LED 1 has a new white value 1 (previous value of 3) because it crossed from white to black bar 307, and LED 2 replaced the LED 1 in the white bar between black bars 305, 307. This results in a new black value of 1 for B2 and a new white value of 3 for W3 (either of them could previously have been output). It is therefore time to produce an output on 304 from the white value of 3 for the middle LED 2. The white value W2 for LED 2 is set to zero.

In the next case represented by the next line, the leading LED 1 is also shown as out of focus because its light spot 304 is bigger than the narrow bars it is passing over and is also picking up some white. Its modulation value therefore decreases to relative value 9. The modulation on LED 2 appears to remain focus and still equals the modulation of the lagging LED 3, so there is no change. The new white value of 1 for W2 is indicative of having passed from the white to a black, so it is now time to produce an output representative of this black-value bar 305, and the black value for B2 is set to zero.

In the next case represented by the last line, the leading LED 1 and the focus LED 2 have less modulation than the lagging LED 3. Operation therefore shifts back to the lagging LEDs as the focus LED.

From this analysis, it should be recognized that the shift of focus LED will always take place on a narrow bar since LEDs at all close focal distances will be in focus (i.e. no overlapping light spot) on a wide bar.

Referring now to FIG. 23, there is shown a chart which illustrates the operation of the present invention in the case of shifting from the focus LED being the one in focus to the leading LED being the one in focus. In the first case represented by the first line, the middle LED 2 is the focus LED with the greater magnitude. The analysis proceeds similar to the analysis set forth with reference to FIG. 22 to the cases represented on the third line in which the focus LED and the leading LED have the same magnitude, and on the forth line in which the leading LED is clearly the focus LED, but the focus LED remains LED 2 with the greatest modulation until the case represented on the last line. Specifically, analysis of the middle LED 2 provides indication of how the outputs are produced. For example, in the case represented by line 3, that middle LED 2 provides an output representative of the previous black value in response to the transition from a white value to a black value before the wide white bar. The values shown on the chart as X's are not known and can be anything. Also, the white value of 3 is stored in this case, and in the next case represented on the next line, the transition from black to white produces an output indicative of the previous white value of 3. In the next case represented on the next line, an output is also produced in response to the transition from the white to the black while storing the white value. Note that the modulation does not drop because the modulation is the modulation from bars BA and WB. The modulation only drops in response to bar BB. In the next case represented by the last line, the modulation has dropped, the input in response to bar BB is supplied as LED 3 crosses from black to white. Normally, an output representative only of the transition on bar WB would be produced. The next output, therefore, is on a white bar (WB), and the shift of focus forward to LED 1 produces an output representative of the next bar BB sensed by the leading LED 1. In this manner, two outputs may be produced properly, but in advance of the time to do so normally, by shifting the focus LED ahead to the leading LED.

From the foregoing analyses of selected operating cases, it should be noted that scanning motion and changes in spacing do not affect correct detection of a bar code being scanned. Also, it should be recalled that sequential activation of photodetectors positioned at different focal distances yields operating results similar to the sequential activation of LED light sources, as previously discussed. Also, it should be noted that many more than three LEDs may be included in the circuit operation as the focus LED is determined, and thereafter as a few leading LEDs and a few lagging LEDs about the focus LED are selected by the microprocessor 114 for subsequent activation. Further, it should be noted that the array 80 of LEDs (or detectors) may be positioned within convenient degrees of mechanical tolerance, and nevertheless be accurately operated under control of the microprocessor 114 in the manner described above.

Figure 24:
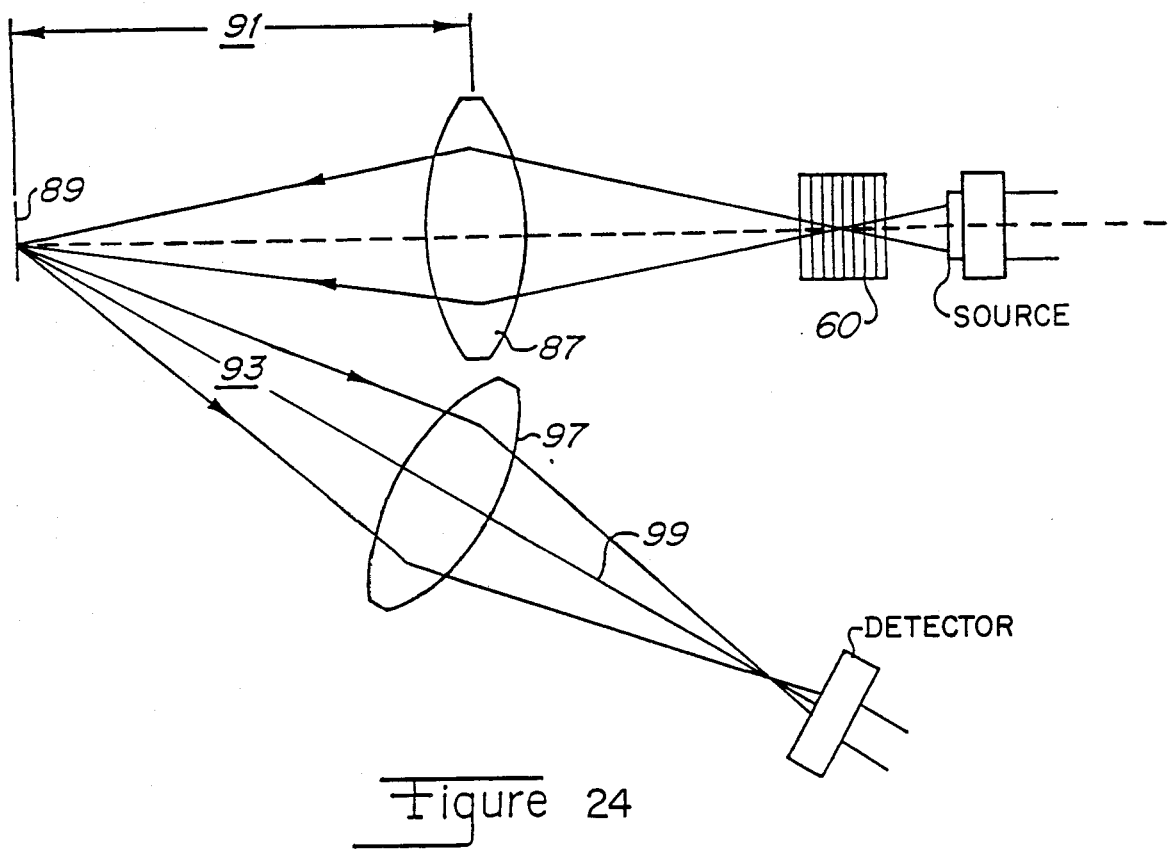
FIG. 24 is a pictorial diagram of another embodiment of the present invention employing a movable shutter.
Figure 25:
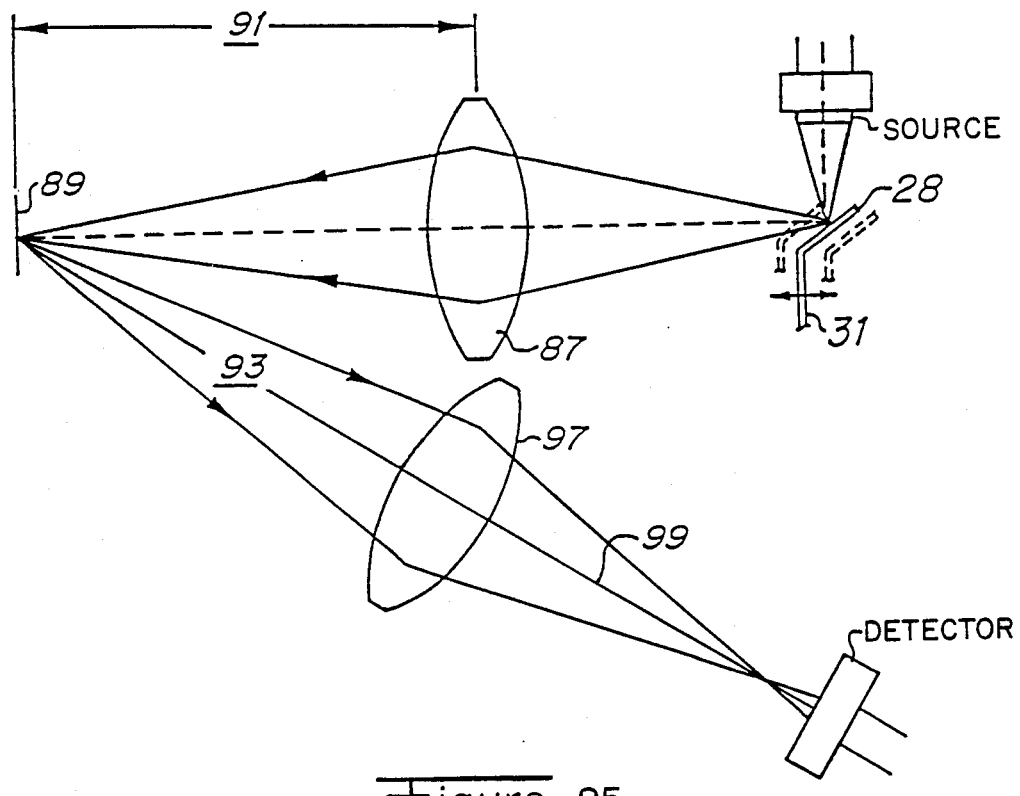
FIG. 25 is a pictorial diagram of another embodiment of the present invention employing a movable mirror.

Referring now to FIG. 24, there is shown a pictorial diagram of an embodiment of the present invention which includes a movable shutter 60 that is formed from an array of aperture cells that are stacked along the central axis of lens 87 intermediate the lens 87 and the source of light. Each aperture cell includes an active region of selected pattern such as circular or rectangular or elliptical slit in a liquid crystal plate that is energized by applied electrical signal in cyclic sequence to form one aperture at a time while the aperture field in all other cells remains transparent. As the distance varies along the central axis of the lens 87 to the active aperture, the distance to the in-focus object in front of the lens 87 also varies. With reference to FIG. 25, there is shown an embodiment of, the present invention in which a mirror 28 supported on a movable lever or beam 31 alters position along the central axis of lens 87. In this embodiment, positional modulation of the lever 31 and mirror 28 supported thereon, with a component of motion oriented along the optical axis of lens 87, may be controlled using known piezoelectric or electronic or electromagnetic device coupled to the lever 31 under control of applied electrical signal, the mirror thus position-modulated along the optical axis of lens 87 is oriented to receive and reflect light from the source toward the object on the opposite side of the lens 87.

I claim:

1. Apparatus for optically sensing contrasting marks on a surface at variable distances therefrom, the apparatus comprising:

radiation sensor means disposed along a first optical axis for producing an output signal representative of radiation received thereby along the first optical axis from such surface;

lens means having a second optical axis that is oriented to intersect said first optical axis;

source means of radiation positioned substantially along said second optical axis for supplying radiation at operatively various distances from said lens means on the opposite side thereof from the intersection of the first and second axes for providing radiation that is focused at various distances from the lens means; and circuit means coupled to the source means and to the sensor means for selectively actuating the source means and responding to the output signal from the sensor means in response to radiation reflected via the surface from the actuated source means to produce an output indicative of the reflected radiation received by the sensor means from the surface in response to the radiation that is supplied thereto whether in focus or out of focus by the source means.

2. Apparatus as in claim 1 wherein said source means include a plurality of individual light sources disposed at various distances from the lens means; and said circuit means selectively actuates said sources to provide radiation that is either substantially in focus or out of focus o the surface positioned at a selected distance from the lens means.

3. Apparatus as in claim 1 comprising:

auxiliary lens means disposed along the first optical axis for providing the radiation sensor means with a field of view along said second optical axis substantially over said distances that the radiation from the source means is focussed.

4. Apparatus as in claim 1 wherein said sensor means includes a plurality of detectors and auxiliary lens means therefor disposed along optical axes that intersect the second optical axis within a selected angle, each of said detectors having a field of view along selected different portions of the second optical axis over the distance that the radiation from the source means is focussed.

5. Apparatus as in claim 2 comprising:

digitizer means coupled to the sensor means for providing digital representations of the radiation received thereby;

said circuit means including memory means for storing at addressable locations therein the digital representations of the radiation received by the sensor means in response to the radiation at various focus distances from the light sources;

said circuit means also including processor means for comparing the digital representations in the addressable locations in said memory means to control actuation of the light sources oriented substantially about the focus distance to the surface.

6. Apparatus as in claim 2 wherein said plurality of individual light source is disposed in a linear array along an axis that is tilted relative to the second optical axis for positioning said sources at various distances from the lens means; and said circuit means sequentially actuates each of said sources to provide radiation that is either substantially in focus or out of focus on the surface positioned at a selected distance from the lens means.

7. Apparatus as in claim 1 wherein said source means includes an aperture interposed between said lens means and a source of radiation for effectively altering the focal distance at which radiation is supplied to the surface from the source means through the lens means and aperture.

8. Apparatus as in claim 7 comprising:

support means for said aperture disposed to effectively alter the location thereof along the second optical axis in response to electrical signals applied thereto; and said circuit means supplies electrical signals to said support means for operatively altering the location of the aperture along the second optical axis.

9. Apparatus as in claim 8 wherein said support means includes a plurality of liquid-crystal cells, each having an electrically-controllable opaque field surrounding an aperture and each being positioned at a different location along the second optical axis for selectively establishing the aperture at the location along said second optical axis at which electrical signal is applied to a cell.

10. Apparatus as in claim 1 wherein said source means includes a mirror selectably positionable between said lens means and a source of radiation for operatively altering the distance therebetween in response to the position of said mirror.

11. Apparatus as in claim 10 comprising support means for said mirror disposed to alter a component of the position thereof along the second optical axis in response to electrical signals applied thereto; and said circuit means supplies electrical signals to said support means for operatively altering the location of the mirror along the second optical axis.

12. Apparatus as in claim 1 comprising:

reflector means positioned at a location within the intersecting first and second axes;

auxiliary source means of radiation positioned on said remote side of the lens means for supplying radiation to the reflector means to reflect toward the sensor means; and said circuit means producing an output indicative of reference reflected radiation in response to radiation received by the sensor means from the auxiliary source means and reflector means.

13. A method for determining the best focus condition of radiation supplied to a bar code of light and dark segments on a surface by individual sources of radiation spaced from the surface to supply radiation thereto, the method comprising the steps of:

activating a plural number of said individual sources in a selected sequence to supply radiation to the surface at various focal distances;

measuring the radiation reflected from the surface in response to activation of a source; and comparing successive measurements of reflected radiation associated with the activation of said individual sources to determine the maximum variation in measurements on light and dark segments of the bar code associated with activations of an individual source as an indication of the individual source supplying radiation to the bar code under the best focus conditions independent of the distance between the source and the surface.

14. A method for determining the best focus condition for sensing the radiation reflected from an illuminated bar code of light and dark segments on a surface by individual sensors of radiation spaced from the surface to detect the radiation reflected therefrom, the method comprising the steps of:

activating a plural number of sensors in a selected sequence to detect radiation reflected from the surface at various focal distances;

measuring the radiation reflected from the surface in response to activation of a sensor; and comparing successive measurements of reflected radiation associated with the activation of the sensors to determine the maximum variation in measurements on light and dark segments of the bar code associated with activations of a sensor as an indication of the sensor detecting radiation reflected from the bar code under the best focus conditions independent of the distance between the sensor and the surface.

15. A method of sensing a bar code on a surface at varying distances therefrom, the method comprising the steps of:

supplying radiation to the surface at various focal distances;

selecting the focal distance at which radiation supplied to the surface is focussed; and sensing the radiation reflected from the surface as the focal distance at which radiation is supplied is altered to produce an output indicative of the relative levels of reflected radiation sensed in response to altered focal distances of the radiation supplied to the surface.

16. The method according to claim 15 where in the step of selecting, individual light sources are positioned to supply radiation at different focal distances when actuated relative to the distance to the surface; and in the step of sensing, the reflected radiation is stored in digital representations in association with actuation of each light source, and the digital representations in storage are compared to control the actuation of the light sources that are positioned substantially about the light source that is positioned to supply radiation substantially in focus to the surface.

17. The method according to claim 15 wherein in the step of supplying, the radiation is supplied to the surface during selectable intervals at a different focal distance in each interval;

and in the step of sensing, the reflected radiation is stored in digital representations for each intervals, and the digital representations in storage are compared to control the actuation during subsequent intervals of the light sources oriented substantially about the light source that is positioned to supply radiation substantially in focus to the surface.

18. The method according to claim 15 comprising the steps of:
   sampling the radiation reflected from the bar code supplied by separate sources at different focal distances;
   comparing the magnitudes of samples to determine the best focus condition for producing representative output of the bar code therefrom.

19. The method according to claim 15 wherein in the step of supplying radiation at various focal distances produces regions of illumination of different areas on the surface; and including the step of
   comparing the magnitudes of the radiation reflected from the surface in response to illuminations of different areas to determine the optimum area of illumination associated with light and dark segments of the bar code for producing therefrom an output representation of the bar code independent of the focal distance to the surface and independent of anomalies in the printing of the light and dark segments of the bar code on the surface.

20. The method according to claim 15 wherein the step of selecting, the magnitudes of the reflected radiation associated with radiation supplied to the surface at various focal distances are compared for selection of the radiation supplied to the surface at the focal distance that produces the greatest magnitude of difference as the bar code on the surface is scanned.

21. The method according to claim 15 wherein the step of sensing, the magnitudes of the reflected radiations associated with radiation supplied to the surface at various focal distances are compared to provide an output indication of the source of radiation supplied to the surface at the focal distance that first produces maximum change in magnitude of reflected radiation and that constitutes a leading source in a direction of scanning movement over the bar code for producing therefrom a representative output indication of the bar code segment scanned.

22. The method according to claim 15 wherein in the step of supplying, radiation is also supplied to an auxiliary reflector positioned to reflect incident radiation; and
   in the step of sensing, an output indication of reference reflected radiation is produced in response to sensing the radiation reflected from the auxiliary reflector.

23. A method of sensing a bar code of light and dark segments on a surface, the method comprising the steps of:
   supplying radiation to the surface at various focal distances;
   measuring the level of radiation reflected from the surface at each focal distance;
   comparing the measurements of the levels of reflected radiation to determine the best focus condition for radiation supplied to the surface; and
   producing an output indication of the bar code in response to the levels of reflections of radiation supplied to the surface under the best focus conditions.

24. The method according to claim 23 wherein in the step of supplying radiation, the radiation is supplied by discrete sources which are selectively activated;
   in the step of measuring, the radiation that is reflected from the surface in response to the activation of each source is stored; and
   in the step of comparing, the stored measurements of reflected radiation are analyzed for maximum variations of reflections from light and dark segments of the bar code associated with successive activations of the discrete sources to determined therefrom the discrete source which supplies radiation to the surface under the best focus conditions independent of distance between the discrete source and surface.

25. A method of sensing a bar code of light and dark segments on a surface according to claim 23 wherein the step of supplying radiation, the radiation is supplied by discrete sources which are selectively activated;
   in the step of measuring, the measurement of the level of radiation that is reflected from the surface in response to the activation of each source is stored; and
   in the step of comparing the stored measurements of levels of reflected radiation are analyzed for variation from a maximum level as the focal distances change to determine therefrom the width of a bar code independent of the distance between the source and surface.

26. A method of sensing a bar code of light and dark segments on a surface according to claim 25 wherein in the step of comparing, the variations from the maximum level are detected with reference to an activated light source for producing an indication of the density of light and dark segments of the bar code independent of the distance between the source and surface.

27. Apparatus for optically sensing contrasting marks on a surface at variable distances therefrom, the apparatus comprising:
   lens means having an optical axis that is oriented to intersect the surface;
   radiation sensor means positioned substantially along said optical axis for receiving radiation from the surface at operatively various distances from said lens means on the opposite side thereof from the surface for producing output signals representative of radiation received thereby at various focal distances from the lens means;
   source means of radiation disposed to illuminate the surface and including auxiliary lens means therefor disposed along a second optical axis that intersects said optical axis within a selected angle;
   said sensor means having a field of view via the lens means along the second optical axis over the distance that reflected radiation from the surface is focused;
   said sensor means including a plurality of detectors, each having a field of view via the lens means along selected different portions of the second optical axis over the distance that reflected radiation from the surface is focused.
   circuit means coupled to the sensor means for selectively actuating the sensor means to respond to radiation reflected via the surface from the source means to produce an output indication of the reflected radiation received by the sensor means whether in focus or out of focus from the contrasting marks on the surface.

28. Apparatus as in claim 27 comprising:

digitizer means coupled to the sensor means for providing digital representation of the radiation received thereby;

said source means includes a plurality of light sources disposed at operatively different locations along the second optical axis;

said circuit means including memory means for storing at addressable locations therein the digital representations of the reflected radiation received at various focal distances by the sensor means and;

said circuit means also including processor means for comparing digital representations in the addressable locations in said memory means to control actuation of the light sources oriented near the locations thereof at which a detector receives radiation substantially in focus from the surface.

29. A method of sensing a bar code on a surface at varying distances therefrom using detector means that provide indications of the radiation reflected by the surface from illuminating sources means of radiation, the method comprising the steps of:

selectively actuating individual source means or detector means to provide indication of the relative levels of radiation reflected from the surface at different focal distances;

storing digital representations of the indications of reflected radiation in association with the actuation of each source means or detector means; and producing an output indication of the bar code from the stored digital representations of the relative levels of reflected radiation from the surface sensed at the different focal distances.

30. The method according to claim 29 comprising the step of:

comparing the digital representations in storage to control the actuation of the individual source means or detection means oriented substantially about the location of the one thereof that is positioned to provide indication of radiation that is reflected from the surface and that is substantially in focus.

31. The method according to claim 29 wherein in the step of selectively actuating, the radiation reflected from the surface is sensed during selectable intervals and the reflected radiation is stored in digital representations for each interval, and the digital representations in storage are compared to control the actuation during subsequent intervals of individual source means and detector means oriented substantially about the location of the one thereof that is positioned to respond to radiation from the surface that is substantially in focus.

32. The method according to claim 29 comprising the steps of:

sampling the radiation reflected from the bar code associated with separate source means or detector means at different focal distances; and comparing the magnitudes of samples to determine the best focus condition among the source means or detector means for producing representative output of the bar code therefrom.

33. The method according to claim 29 wherein the step of selectively actuating includes sensing the radiation reflected from illuminated regions of different areas on the surface at various focal distances; and the step of producing includes comparing the magnitudes of the sensed reflected radiation from the surface in different areas of illumination to determine the optimum area of illumination associated with light and dark segments of the bar code for producing therefrom an output representation of the bar code independent of the distance to the surface and independent of anomalies in the printing of the light and dark segments of the bar code on the surface.

34. The method according to claim 29 comprising the step of:

scanning the detector means along the bar code;

comparing the magnitudes of the reflected radiation associated with the actuated source means or detector means for selection of the one thereof producing the greatest difference between levels of the reflected radiation as the bar code on the surface is scanned.

35. The method according to claim 29 wherein the step of selectively actuating, the magnitudes of the levels of reflected radiation associated with actuated source means or detector means are compared to provide an output indication of the one thereof that first produces the maximum change in level of reflected radiation and that constitutes the leading source means or detector means in the direction of scanning movement over the bar code for producing therefrom a representative output indicative of the bar code segment scanned.

36. The method of sensing a bar code of light and dark segments on a surface using a plurality of discrete radiation sensors, the method comprising the steps of:

supplying radiation to the surface;

selectively activating the sensors to measure the radiation reflected from the surface at various focal distances;

storing the measurements of the radiation reflected from the surface in response to the activation of each sensor;

comparing the stored measurements of reflected radiation to determine the maximum variations of radiation reflected from light and dark segments of the bar code associated with successive activations of the sensors to determine therefrom the sensor which detects radiation reflected from the surface under the best focus condition for measuring radiation reflected from the surface independent of the distance between the sensors and the surface; and producing an output indication of the bar code in response to the sensed radiation reflected from the surface under the best focus conditions.

* * * * *